US011265266B2

(12) United States Patent
Suzuki

(10) Patent No.: US 11,265,266 B2
(45) Date of Patent: Mar. 1, 2022

(54) COMPUTER-READABLE RECORDING MEDIUM RECORDING PORT SWITCHING PROGRAM AND PORT SWITCHING METHOD

(71) Applicant: FUJITSU LIMITED, Kawasaki (JP)

(72) Inventor: Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 404 days.

(21) Appl. No.: 16/448,115

(22) Filed: Jun. 21, 2019

(65) Prior Publication Data

US 2019/0306084 A1  Oct. 3, 2019

Related U.S. Application Data

(63) Continuation of application No. PCT/JP2018/000119, filed on Jan. 5, 2018.

(30) Foreign Application Priority Data

Jan. 16, 2017  (JP) .............................. JP2017-005442

(51) Int. Cl.
*H04L 12/931* (2013.01)
*H04L 49/20* (2022.01)
(Continued)

(52) U.S. Cl.
CPC ........ *H04L 49/208* (2013.01); *G06F 9/45558* (2013.01); *G06F 13/00* (2013.01);
(Continued)

(58) Field of Classification Search
CPC ............. G06F 13/00; G06F 2009/4557; G06F 2009/45595; G06F 2009/45558;
(Continued)

(56) References Cited

U.S. PATENT DOCUMENTS 6,192,514 B1 *  2/2001  Lurndal ................ G06F 9/4812
                                                              717/149
9,372,631 B1 *  6/2016  Rozendorn ........... G06F 3/0619
(Continued)

FOREIGN PATENT DOCUMENTS

JP        2009-130528       6/2009
JP        2015-197715       11/2015
(Continued)

OTHER PUBLICATIONS

Suzuki et al., "Traffic Isolation Method for OpenStack Tap-as-a-Service," IEEE IEICE, vol. 116. No. 404, ICM 2016-50, pp. 63-68, Jan. 12, 2017 (8 pages), Cited in ISR.
(Continued)

*Primary Examiner* — Dung B Huynh
(74) *Attorney, Agent, or Firm* — Fujitsu Patent Center

(57) ABSTRACT

A non-transitory computer-readable recording medium is provided in which a port switching program for causing a computer to execute a process including: transmitting, in response to a mirror switching instruction that specifies a migration source port and a migration destination port, a first mirror switching notification to a virtual switch that has the migration destination port to request a change of mirror setting in the migration destination port; canceling mirror setting for a transmission packet to the migration destination port in the migration source port; and canceling mirror setting for a received packet from the migration destination port in the migration source port in response to a second mirror switching notification from the virtual switch, the second mirror switching notification indicating the change of the mirror setting in the migration destination port is stored.

16 Claims, 20 Drawing Sheets

(51) Int. Cl.
    *G06F 9/455*    (2018.01)
    *H04L 49/00*    (2022.01)
    *H04L 69/40*    (2022.01)
    *G06F 13/00*    (2006.01)
(52) U.S. Cl.
    CPC .............. *H04L 49/70* (2013.01); *H04L 69/40* (2013.01); *G06F 2009/4557* (2013.01); *G06F 2009/45595* (2013.01)
(58) Field of Classification Search
    CPC ....... H04L 49/254; H04L 49/30; H04L 49/70; H04L 49/208; H06L 69/40
    See application file for complete search history.

(56) References Cited

U.S. PATENT DOCUMENTS

| | | | | |
|---|---|---|---|---|
| 9,672,054 | B1* | 6/2017 | Gupta | G06F 9/45533 |
| 9,830,105 | B1* | 11/2017 | Tummala | G06F 3/0617 |
| 2002/0054595 | A1* | 5/2002 | Ambe | H04L 49/208 |
| | | | | 370/390 |
| 2005/0251620 | A1* | 11/2005 | Matsunami | G06F 3/067 |
| | | | | 711/114 |
| 2006/0064466 | A1* | 3/2006 | Shiga | H04L 67/1095 |
| | | | | 709/214 |
| 2007/0112974 | A1* | 5/2007 | Shirogane | H04L 69/40 |
| | | | | 709/239 |
| 2007/0230455 | A1* | 10/2007 | Hsieh | H04L 12/4625 |
| | | | | 370/389 |
| 2008/0031259 | A1* | 2/2008 | Zampiello | H04L 63/1408 |
| | | | | 370/395.52 |
| 2009/0006793 | A1* | 1/2009 | Yamada | G06F 11/1666 |
| | | | | 711/162 |
| 2009/0037638 | A1* | 2/2009 | Izuta | G06F 3/0613 |
| | | | | 710/316 |
| 2009/0157846 | A1* | 6/2009 | Shimozono | H04L 49/253 |
| | | | | 709/218 |
| 2010/0030986 | A1* | 2/2010 | Shinozaki | G06F 3/0656 |
| | | | | 711/162 |
| 2010/0115080 | A1* | 5/2010 | Kageyama | H04L 29/12028 |
| | | | | 709/223 |
| 2011/0280149 | A1 | 11/2011 | Okada et al. | |
| 2012/0096192 | A1* | 4/2012 | Tanaka | G06F 13/385 |
| | | | | 710/20 |
| 2012/0131289 | A1* | 5/2012 | Taguchi | G06F 3/0635 |
| | | | | 711/162 |
| 2012/0195187 | A1* | 8/2012 | Ashihara | H04L 49/25 |
| | | | | 370/220 |
| 2012/0216005 | A1* | 8/2012 | Naito | G06F 3/0635 |
| | | | | 711/165 |
| 2012/0226860 | A1* | 9/2012 | Saito | G06F 3/067 |
| | | | | 711/118 |
| 2012/0257631 | A1* | 10/2012 | Nguyen | H04L 45/18 |
| | | | | 370/400 |
| 2012/0278807 | A1* | 11/2012 | Nakagawa | H04L 12/4679 |
| | | | | 718/1 |
| 2012/0290750 | A1* | 11/2012 | Kawaguchi | G06F 11/2007 |
| | | | | 710/74 |
| 2013/0061225 | A1* | 3/2013 | Nakagawa | G06F 9/45558 |
| | | | | 718/1 |
| 2013/0339647 | A1* | 12/2013 | Jindo | G06F 3/0647 |
| | | | | 711/165 |
| 2014/0003427 | A1* | 1/2014 | Nishi | H04L 45/16 |
| | | | | 370/390 |
| 2014/0032838 | A1* | 1/2014 | Takeuchi | G06F 3/067 |
| | | | | 711/114 |
| 2014/0089445 | A1* | 3/2014 | Suzuki | H04L 29/08549 |
| | | | | 709/212 |
| 2015/0052531 | A1* | 2/2015 | Helak | G06F 9/4856 |
| | | | | 718/102 |
| 2015/0089045 | A1* | 3/2015 | Agarwal | H04L 49/208 |
| | | | | 709/224 |
| 2015/0195102 | A1* | 7/2015 | Mochida | H04L 49/557 |
| | | | | 370/223 |
| 2015/0234907 | A1* | 8/2015 | Shinohara | G06F 11/3664 |
| | | | | 702/123 |
| 2015/0277959 | A1* | 10/2015 | Higuchi | G06F 9/45558 |
| | | | | 718/1 |
| 2016/0026409 | A1* | 1/2016 | Tanaka | G06F 12/0866 |
| | | | | 711/120 |
| 2016/0239328 | A1* | 8/2016 | Kaplan | G06F 9/45558 |
| 2017/0034065 | A1* | 2/2017 | Iwakura | H04L 49/208 |
| 2017/0315836 | A1* | 11/2017 | Langer | G06F 11/301 |
| 2018/0167287 | A1* | 6/2018 | Lim | H04L 43/026 |

FOREIGN PATENT DOCUMENTS

| | | |
|---|---|---|
| JP | 2016-149686 | 8/2016 |
| WO | 2010/086907 | 8/2010 |

OTHER PUBLICATIONS

International Search Report and Written Opinion of the International Searching Authority, mailed in connection with PCT/JP2018/000119 and dated Apr. 3, 2018 (10 pages), with partial translation.

* cited by examiner

FIG. 6

| PORT ID | SRC VMID | DST VMID | TRANSMISSION FLAG | RECEPTION FLAG |
|---|---|---|---|---|
| P2 | VM2 | VM3 | True | True |
| P2 | VM2 | VM4 | True | True |
| ... | ... | ... | ... | ... |

TB3-1, 610-1, 610-2

| PORT ID | SRC VMID | DST VMID | TRANSMISSION FLAG | RECEPTION FLAG |
|---|---|---|---|---|
| P3 | VM3 | VM2 | False | False |
| ... | ... | ... | ... | ... |

TB3-2, 620-1

| PORT ID | SRC VMID | DST VMID | TRANSMISSION FLAG | RECEPTION FLAG |
|---|---|---|---|---|
| P4 | VM4 | VM2 | False | False |
| ... | ... | ... | ... | ... |

TB3-3, 630-1

COMPUTER-READABLE RECORDING MEDIUM RECORDING PORT SWITCHING PROGRAM AND PORT SWITCHING METHOD

CROSS-REFERENCE TO RELATED APPLICATION

This application is a continuation application of International Application PCT/JP2018/000119 filed on Jan. 5, 2018 and designated the U.S., the entire contents of which are incorporated herein by reference. The International Application PCT/JP2018/000119 is based upon and claims the benefit of priority of the prior Japanese Patent Application No. 2017-005442, filed on Jan. 16, 2017, the entire contents of which are incorporated herein by reference.

FIELD

The embodiments discussed herein are related to a port switching program, a port switching method, and an information processing device.

BACKGROUND

There is a technique for mirroring data flowing through a port of a virtual switch connected to a virtual machine (VM) to accumulate and analyze.

International Publication Pamphlet No. WO 2010/086907, Japanese Laid-open Patent Publication No. 2009-130528, and Japanese Laid-open Patent Publication No. 2016-149686 are disclosed as related art.

SUMMARY

According to an aspect of the embodiments, a non-transitory computer-readable recording medium having stored therein a port switching program for causing a computer to execute a process including: transmitting, in response to a mirror switching instruction that specifies a migration source port and a migration destination port, a first mirror switching notification to a virtual switch that has the migration destination port to request a change of mirror setting in the migration destination port; canceling mirror setting for a transmission packet to the migration destination port in the migration source port; and canceling mirror setting for a received packet from the migration destination port in the migration source port in response to a second mirror switching notification from the virtual switch, the second mirror switching notification indicating the change of the mirror setting in the migration destination port is provided.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a block diagram illustrating an example of a hardware configuration of an information processing device PMi or the like;

FIG. 6 is an explanatory diagram illustrating an example of the storage contents of a mirror filter management table TB3;

DESCRIPTION OF EMBODIMENTS

Mirroring consumes various resources such as a central processing unit (CPU) and communication bandwidth, and thus affects other VMs on the same host in some cases. Therefore, the mirroring process is sometimes switched to another virtual switch according to the load.

For example, when a measuring device A is replaced with a measuring device B for capturing, the measuring device B is instructed to start capturing and, after a status representing that a packet has been captured is notified from the measuring device B, the measuring device A is instructed to stop capturing. For example, when capture data is received from a control link, the capture data is mirrored to an upstream port and traffic flowing in from a user data link is excluded from the target of the capture process. For example, when it is estimated that a line bandwidth of a tunnel set between a virtual machine constructed on a physical server and a port of a virtual switch corresponding to the virtual machine does not satisfy the communication bandwidth for port mirror traffic, the virtual machine is moved to a different physical server.

However, it may be difficult to switch a mirror port without losing packets. For example, in a method for restraining packet loss in which mirroring is performed by two mirror ports to duplicate packets and duplicate packets are removed at a packet collecting and analyzing side, it takes load and time to remove duplication and there is a possibility of affecting later analysis.

In one aspect, a mirror port may be switched without losing packets.

Hereinafter, embodiments of a port switching program, a port switching method, and an information processing device according to the present invention will be described in detail with reference to the drawings.

(Embodiments)

Figure 1:
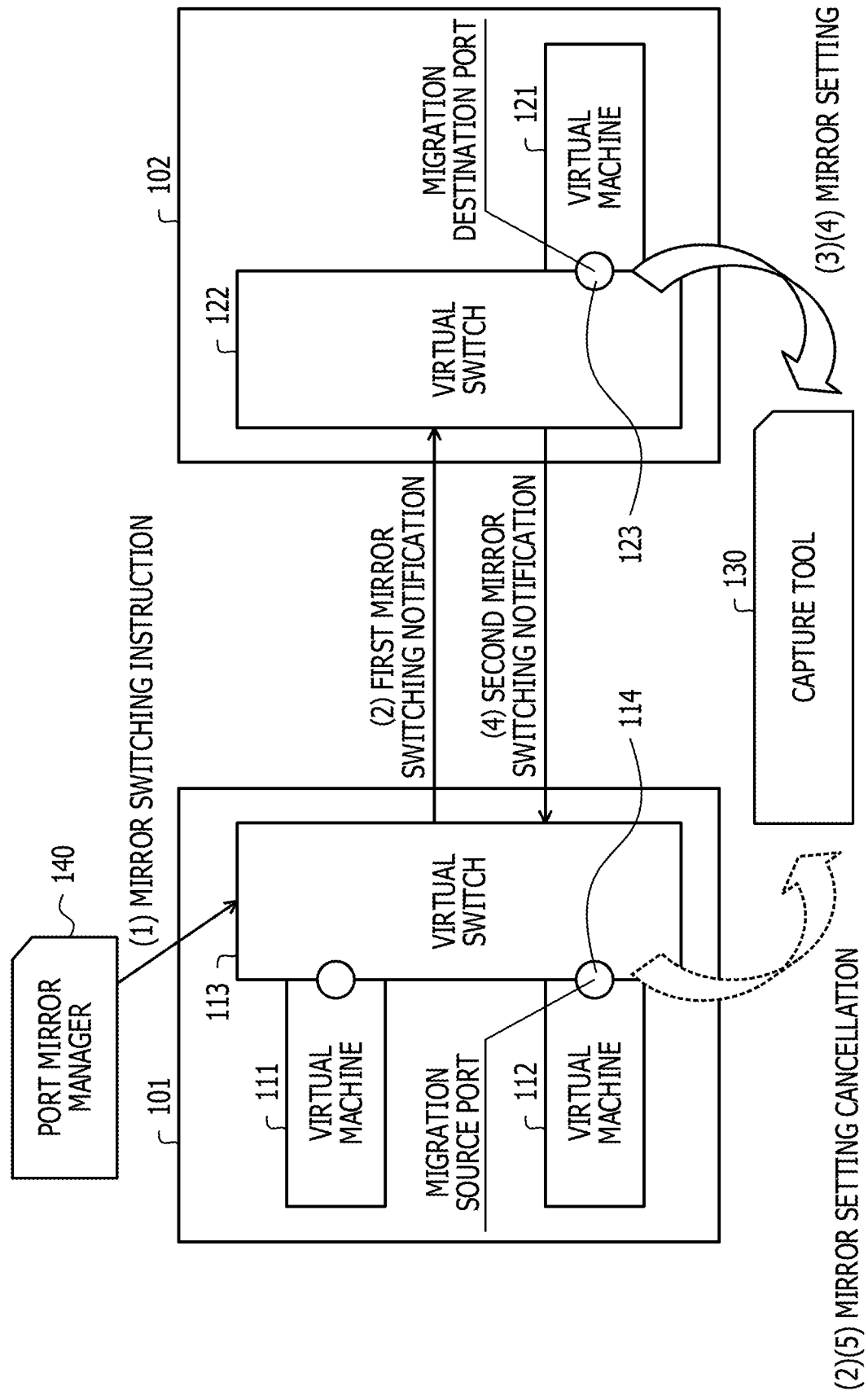
FIG. 1 is an explanatory diagram illustrating a working example of a port switching method according to an embodiment.

FIG. 1 is an explanatory diagram illustrating a working example of a port switching method according to an embodiment. In FIG. 1, information processing devices 101 and 102 are computers each capable of virtualizing hardware resources of the own device and executing a plurality of different operating systems (OSs). The hardware resources of the own device include, for example, a CPU, a memory, and an interface (I/F).

For example, the information processing devices 101 and 102 each can run the OS by a virtual machine that operates in an execution environment constructed by dividing hardware resources of the own device. The virtual machine is a virtual computer that operates in an execution environment constructed by dividing hardware resources of a physical computer.

In the example in FIG. 1, it is assumed that virtual machines 111 and 112 operate on the information processing device 101 and virtual machine 121 operates on the information processing device 102.

The information processing devices 101 and 102 also have virtual switches. The virtual switch is a virtual network switch that links virtual machines on a physical server or links a virtual machine and an external network.

In the example in FIG. 1, the information processing device 101 has a virtual switch 113 connected to the virtual machines 111 and 112. In addition, the information processing device 102 has a virtual switch 122 connected to the virtual machine 121. The virtual switches 113 and 122 have a port mirroring function. Port mirroring is a function of mirroring an input packet or output packet or both the packets of a port to another port.

In the example in FIG. 1, it is assumed that packets transmitted and received between the virtual machines 112 and 121 are mirrored at a port 114 of the virtual switch 113. The packets mirrored at the port 114 are sent to a capture tool 130 and used for various types of analysis.

Mirroring consumes various resources such as the CPU and communication bandwidth and thus affects another virtual machine on the same host in some cases. In the example in FIG. 1, the mirroring process in the virtual switch 113 affects the performance of, for example, the virtual machine 111 in some cases.

Therefore, the mirroring process is sometimes switched to another virtual switch according to the load. Since analysis is affected if packet loss is produced at this time, there is a method in which mirroring is performed by two mirror ports to duplicate packets and duplicate packets are removed at a packet collecting and analyzing side. The mirror port is a port that mirrors a packet. However, it takes load and time to accurately remove duplicate mirror packets and there is a possibility of affecting later analysis.

In addition, in order to restrain packet loss and duplication, it is conceivable to suspend all related virtual machines until mirror port switching is completed. However, when all related virtual machines are suspended, there is a disadvantage that communication other than for the mirroring target or a process other than the communication are also stopped.

In view of the above disadvantage, in the present embodiment, a port switching method capable of switching a mirror port without causing packet loss or duplication will be described. Hereinafter, a process example of this port switching method will be described. In the following explanation, a case where the port 114 of the virtual switch 113 is assigned as a migration source port, a port 123 of the virtual switch 122 is assigned as a migration destination port, and the mirror port is switched from the port 114 to the port 123 will be described as an example.

(1) The information processing device 101 accepts a mirror switching instruction that specifies the migration source port and the migration destination port, through the virtual switch 113. The mirror switching instruction is an instruction for switching the mirror port from the migration source port to the migration destination port. For example, the information processing device 101 accepts the mirror switching instruction from a port mirror manager 140 through the virtual switch 113. The port mirror manager 140 is software that manages mirroring at the port of the virtual switch.

(2) In response to the acceptance of the mirror switching instruction through the virtual switch 113, the information processing device 101 transmits a first mirror switching notification to the virtual switch 122 having the migration destination port and also cancels the mirror setting for a transmission packet to the migration destination port in the migration source port.

The first mirror switching notification is a notification for switching the mirror port from the migration source port to the migration destination port and requests the change of the mirror setting in the migration destination port. Canceling the mirror setting for the transmission packet means canceling the mirror setting so as not to perform mirroring of the packet to be transmitted from the migration source port to the migration destination port.

With this procedure, in the virtual switch 113, at the timing when the first mirror switching notification is transmitted to the virtual switch 122, a packet to be transmitted from the migration source port (port 114) to the migration destination port (port 123) thereafter is properly excluded from mirroring targets.

(3) In response to the acceptance of the first mirror switching notification from the virtual switch 113 having the migration source port through the virtual switch 122, the information processing device 102 makes the mirror setting for the received packet from the migration source port in a migration destination port specified from the first mirror switching notification. The mirror setting for the received packet means making the mirror setting so as to perform mirroring of the packet received from the migration source port in the migration destination port.

With this procedure, in the virtual switch 122, at the timing when the first mirror switching notification is received from the virtual switch 113, a packet to be received from the migration source port (port 114) in the migration destination port (port 123) thereafter is properly treated as a mirroring target.

(4) In response to the mirror setting for the received packet made by the virtual switch 122, the information processing device 102 transmits a second mirror switching notification to the virtual switch 113 and also makes the mirror setting for a transmission packet to the migration source port in the migration destination port.

The second mirror switching notification is a notification indicating the change of the mirror setting in the migration destination port. The mirror setting for the transmission packet means making the mirror setting so as to perform mirroring of the packet transmitted from the migration destination port to the migration source port. For example, the second mirror switching notification can be said as a notification indicating the completion of the mirror setting switching in the migration destination port, because the mirror setting for the received packet and the transmission packet in the migration destination port is made before and after the transmission of the second mirror switching notification.

With this procedure, in the virtual switch 122, at the timing when the second mirror switching notification is transmitted to the virtual switch 113, a packet to be transmitted from the migration destination port (port 123) to the migration source port (port 114) thereafter is properly treated as a mirroring target.

(5) In response to the acceptance of the second mirror switching notification from the virtual switch 122 through the virtual switch 113, the information processing device 101 cancels the mirror setting for the received packet from the migration destination port in the migration source port. Canceling the mirror setting for the received packet means canceling the mirror setting so as not to perform mirroring of the packet to be received from the migration destination port in the migration source port.

With this procedure, in the virtual switch 113, at the timing when the second mirror switching notification is accepted from the virtual switch 122, a packet to be received from the migration destination port (port 123) in the migration source port (port 114) thereafter is properly excluded from mirroring targets.

In this manner, according to the information processing devices 101 and 102, the mirror settings in the migration source port and the migration destination port are properly switched at the timing when the first and second mirror switching notifications are transmitted and received. With this process, the mirror port is reliably switched at the aligned timing of switching the mirror port, without causing packet loss or duplication. In addition, since the related virtual machines (for example, the virtual machines 112 and 121) are not suspended when the mirror port is switched, the mirror port is preferably switched without stopping the communication other than for the mirroring target or a process other than the communication.

(Example of System Configuration of System 200)

Next, an example of a system configuration of a system 200 according to the embodiment will be described.

Figure 2:
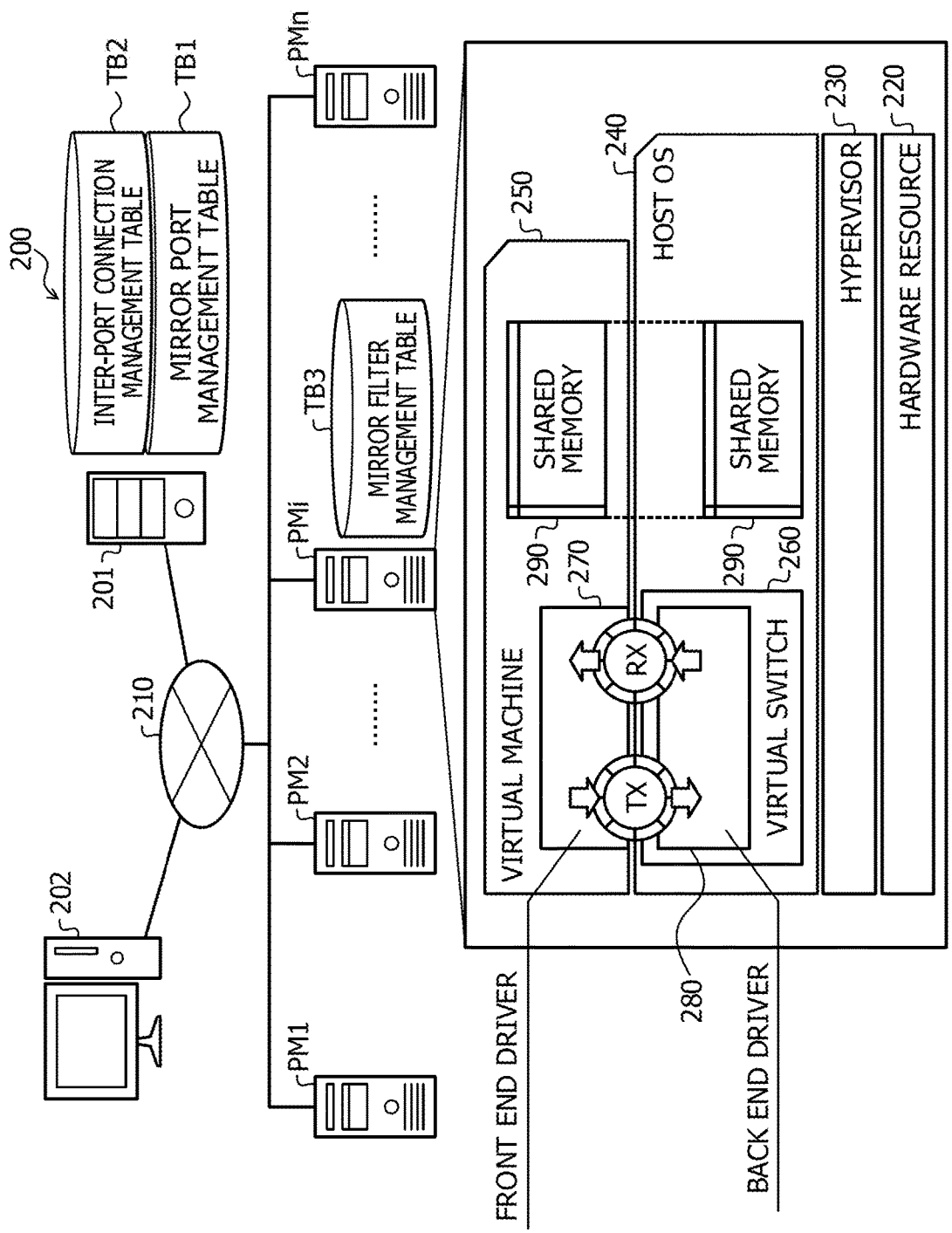
FIG. 2 is an explanatory diagram illustrating an example of a system configuration of a system 200.

FIG. 2 is an explanatory diagram illustrating an example of a system configuration of the system 200. In FIG. 2, the system 200 includes information processing devices PM1 to PMn (n: a natural number equal to or greater than two), a management device 201, and an administrator terminal 202. In the system 200, the information processing devices PM1 to PMn, the management device 201, and the administrator terminal 202 are connected via a wired or wireless network 210. The network 210 includes, for example, a local area network (LAN), a wide area network (WAN), and the Internet.

In the following description, an arbitrary information processing device among the information processing devices PM1 to PMn is sometimes referred to as "information processing device PMi" (i=1, 2, . . . , n). In addition, among the information processing devices PM1 to PMn, an information processing device having a capture tool C is sometimes referred to as "information processing device PMm". The capture tool C is software that accumulates and analyzes mirror packets.

The management device 201 is a computer having a port mirror manager M. The port mirror manager M is software that manages mirroring at the port of the virtual switch. The port mirror manager 140 illustrated in FIG. 1 correlates to, for example, the port mirror manager M.

The management device 201 also has a mirror port management table TB1 and an inter-port connection management table TB2. The mirror port management table TB1 and the inter-port connection management table TB2 are information used by the port mirror manager M. The storage contents of the mirror port management table TB1 and the inter-port connection management table TB2 will be described later with reference to FIGS. 4 and 5.

The administrator terminal 202 is a computer used by an administrator of the system 200 and is, for example, a personal computer (PC).

The information processing device PMi is a computer capable of virtualizing a hardware resource 220 of the own device and executing a plurality of different OSs. For example, the information processing device PMi includes a hypervisor 230, a host OS 240, and a virtual machine 250. The hypervisor 230 is software that virtualizes a computer and enables a plurality of OSs to be executed in parallel.

The host OS 240 is an OS that serves as a basis for operating the virtual machine 250. The host OS 240 has a virtual switch 260. The virtual machine 250 has a front end driver 270. The virtual switch 260 has a back end driver 280. The front end driver 270 and the back end driver 280 are paravirtual (PV) drivers for accessing hardware.

For example, the front end driver 270 writes a packet to be transmitted, to a shared memory 290 at the time of packet transmission. The shared memory 290 is implemented by, for example, a memory 302 illustrated in FIG. 3 to be described later. Then, the front end driver 270 writes the write destination address of the shared memory 290 to a ring buffer TX and notifies the back end driver 280 of the write destination address. The back end driver 280 reads the write destination address from the ring buffer TX and reads out the packet from the write destination address of the shared memory 290 to perform a transmission process.

In addition, the back end driver 280 writes a packet that has been received, to the shared memory 290 at the time of packet reception. Then, the back end driver 280 writes the write destination address of the shared memory 290 to a ring buffer RX and notifies the front end driver 270 of the write destination address. The front end driver 270 reads the write destination address from the ring buffer RX and reads out the packet from the write destination address of the shared memory 290 to perform a reception process. The ring buffers TX and RX are included in, for example, the shared memory 290.

According to the front end driver 270 and the back end driver 280, it is feasible to reduce the overhead of input/output (I/O) processes and to accelerate a network interface card (NIC).

The information processing device PMi has a mirror filter management table TB3. The mirror filter management table TB3 is information used by the virtual switch 260. The storage contents of the mirror filter management table TB3 will be described later with reference to FIG. 6. The information processing devices 101 and 102 illustrated in FIG. 1 correlate to, for example, the information processing device PMi.

Although a case where the port mirror manager M is operated on the management device 201 has been described here as an example, the present invention is not limited to this example. For example, the port mirror manager M may be operated on the information processing device PMi or on the administrator terminal 202.

(Example of Hardware Configuration of Information Processing Device PMi)

Next, an example of a hardware configuration of the information processing device PMi, the management device 201, and the administrator terminal 202 illustrated in FIG. 2 will be described. Here, the information processing device PMi, the management device 201, and the administrator terminal 202 will be described as "information processing device PMi or the like".

Figure 3:
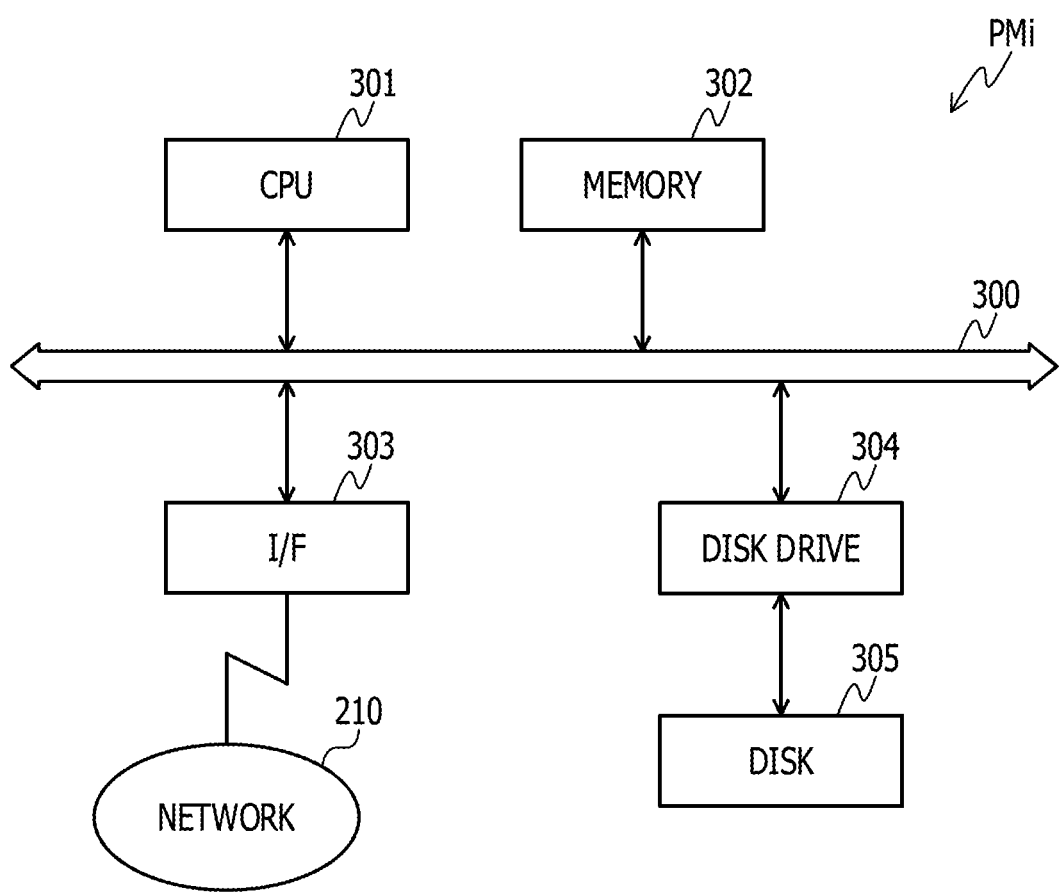

FIG. 3 is a block diagram illustrating an example of a hardware configuration of the information processing device PMi or the like. In FIG. 3, the information processing device PMi or the like has a CPU 301, the memory 302, an interface (I/F) 303, a disk drive 304, and a disk 305. Each component is connected by a bus 300.

The CPU 301 supervises the overall control of the information processing device PMi or the like. The memory 302 has, for example, a read only memory (ROM), a random access memory (RAM), and a flash ROM. For example, the flash ROM or the ROM stores various programs, while the RAM is used as a work area of the CPU 301. The program stored in the memory 302 is loaded by the CPU 301 to cause the CPU 301 to execute a coded process.

The I/F 303 is connected to the network 210 through a communication line and is connected to another device via the network 210. Additionally, the I/F 303 supervises the interface between the network 210 and the inside of its own device and controls input and output of data with another device. For example, a modem or a LAN adapter can be adopted as the I/F 303.

The disk drive 304 controls reading and writing of data with respect to the disk 305 in accordance with the control of CPU 301. The disk 305 stores data written under the control of the disk drive 304. Examples of the disk 305 include a magnetic disk and an optical disc.

The information processing device PMi or the like may have, for example, a solid state drive (SSD), an input device, and a display, in addition to the above-described components.

(Storage Contents of Mirror Port Management Table TB1)

Next, the storage contents of the mirror port management table TB1 included in the management device 201 will be described. The mirror port management table TB1 is stored in, for example, a storage device such as the memory 302 and the disk 305 of the management device 201 illustrated in FIG. 3.

Figure 4:
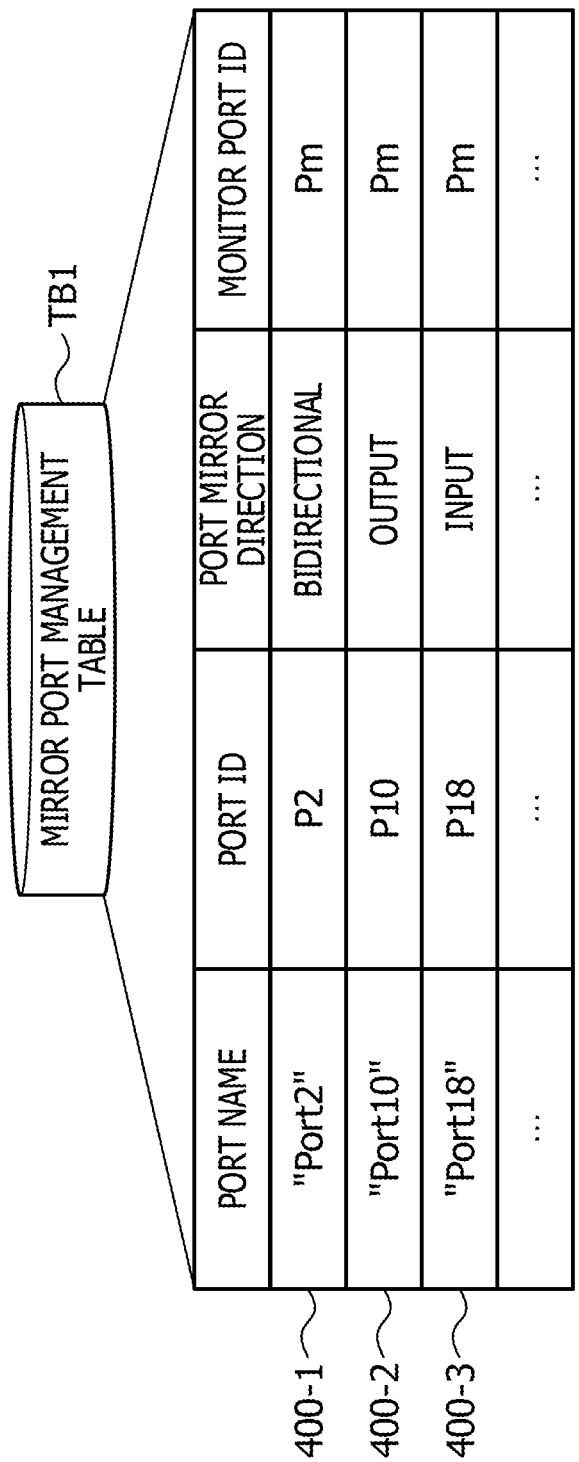
FIG. 4 is an explanatory diagram illustrating an example of the storage contents of a mirror port management table TB1.

FIG. 4 is an explanatory diagram illustrating an example of the storage contents of the mirror port management table TB1. In FIG. 4, the mirror port management table TB1 has fields for a port name, a port ID, a port mirror direction, and a monitor port ID. By setting information in each field, mirror port management information (for example, mirror port management information 400-1 to mirror port management information 400-3) is stored as a record.

The port name is the name of a port of the virtual switch 260 connected to the virtual machine 250. The port ID is an identifier that uniquely identifies the port of the virtual switch 260 connected to the virtual machine 250. The port mirror direction indicates a direction in which the packet is mirrored.

For example, the port mirror direction "bidirectional" indicates that both of the received packet and the transmission packet flowing through the port with the port ID are mirrored. The received packet is a packet received by the port (input packet). The transmission packet is a packet transmitted from the port (output packet).

The port mirror direction "output" indicates that the transmission packet flowing through the port with the port ID is mirrored. The port mirror direction "input" indicates that the received packet flowing through the port with the port ID is mirrored. The monitor port ID is an identifier that uniquely identifies a port connected to the capture tool C of the information processing device PMm.

For example, the mirror port management information 400-1 indicates the port mirror direction "bidirectional" and the monitor port ID "Pm" of a port with the port name ""Port2"" and the port ID "P2". The mirror port management table TB1 may not contain port name information.

(Storage Contents of Inter-Port Connection Management Table TB2)

Next, the storage contents of the inter-port connection management table TB2 included in the management device 201 will be described. The inter-port connection management table TB2 is stored in, for example, a storage device such as the memory 302 and the disk 305 of the management device 201 illustrated in FIG. 3.

Figure 5:
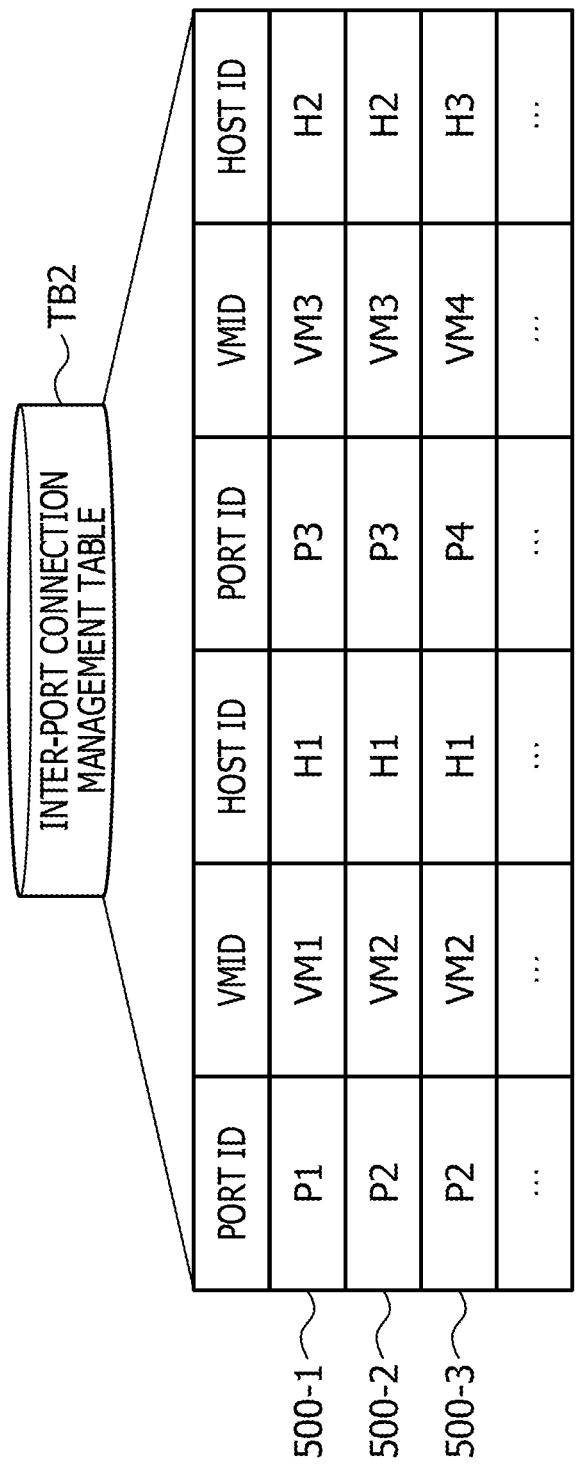
FIG. 5 is an explanatory diagram illustrating an example of the storage contents of an inter-port connection management table TB2.

FIG. 5 is an explanatory diagram illustrating an example of the storage contents of the inter-port connection management table TB2. In FIG. 5, the inter-port connection management table TB2 stores, as a record, inter-port connection management information (for example, inter-port connection management information 500-1 to inter-port connection management information 500-3) indicating the connection relationship between ports.

A connection source port and a connection destination port are specified from the combination of the port ID, a VM ID, and a host ID. The port ID is a port ID of a port included in the virtual switch 260. The VM ID is an identifier that uniquely identifies the virtual machine 250 connected to the port with the port ID.

For example, an Internet protocol (IP) address or a media access control (MAC) address can be used as the VM ID. The host ID is an identifier that uniquely identifies the host OS 240 on which the virtual machine 250 operates.

In the following description, the host OS 240 with the host ID "H #" is sometimes referred to as "host H #". The virtual switch 260 of the host H # is sometimes referred to as "virtual switch SW #". The virtual machine 250 with the VM ID "VM #" is sometimes referred to as "virtual machine VM #". A port with the port ID "P #" is sometimes referred to as "port P #".

For example, the inter-port connection management information 500-1 indicates the connection relationship between a port P1 of a virtual switch SW1 connected to a virtual machine VM1 operating on a host H1 and a port P3 of a virtual switch SW2 connected to a virtual machine VM3 operating on a host H2.

Each entry (record) in the inter-port connection management table TB2 is created when, for example, the virtual machine 250 is generated. A communication partner of the virtual machine 250 may be selected according to, for example, the application, or may be specified by capturing a packet between virtual machines.

(Storage Contents of Mirror Filter Management Table TB3)

Next, the storage contents of the mirror filter management table TB3 included in the information processing device PMi will be described. The mirror filter management table TB3 is stored in, for example, a storage device such as the memory 302 and the disk 305 of the information processing device PMi illustrated in FIG. 3. The mirror filter management table TB3 is transmitted from the port mirror manager M to the virtual switch 260 of each of migration source and migration destination host OSs 240 when the mirror port is switched. The migration source host OS 240 is the host OS 240 having the migration source port. The migration destination host OS 240 is the host OS 240 having the migration destination port.

FIG. 6 is an explanatory diagram illustrating an example of the storage contents of the mirror filter management table TB3. In FIG. 6, the mirror filter management table TB3 (TB3-1 to TB3-3) has fields for a port ID, an SRC VM ID, a DST VM ID, a transmission flag, and a reception flag. By setting information in each field, mirror filter information (610-1, 610-2, 620-1, and 630-1) is stored as a record.

The mirror filter management table TB3-1 is used by the virtual switch SW1 of the migration source host H1. The mirror filter management table TB3-2 is used by the virtual switch SW2 of the migration destination host H2. The mirror filter management table TB3-3 is used by the virtual switch SW3 of the migration destination host H3.

The port ID is a port ID of a port included in the virtual switch 260 of the host OS 240. The source (SRC) VM ID is a VM ID of the virtual machine 250 connected to the port with the port ID. The destination (DST) VM ID is a VM ID of the communication destination virtual machine 250 that communicates with the virtual machine 250 with the SRC VM ID via the port with the port ID.

The transmission flag is information indicating whether or not the transmission packet is to be mirrored at the port with the port ID. In this example, when the transmission packet is to be mirrored, "True" is set to the transmission flag and, when the transmission packet is not to be mirrored, "False" is set to the transmission flag.

The reception flag is information indicating whether or not the received packet is to be mirrored at the port with the port ID. In this example, when the received packet is to be mirrored, "True" is set to the reception flag and, when the received packet is not to be mirrored, "False" is set to the reception flag.

Each mirror filter management table TB3 (TB3-1 to TB3-3) may include, for example, information specifying the port mirror direction of the migration source port.

For example, the mirror filter information 610-1 indicates that the transmission packet to the virtual machine VM3 and the received packet from the virtual machine VM3 are to be mirrored at the port P2 connected to the virtual machine VM2. The mirror filter information 620-1 indicates that the transmission packet to the virtual machine VM2 and the received packet from the virtual machine VM2 are not mirrored at the port P3 connected to the virtual machine VM3.

Each mirror filter management table TB3 (TB3-1 to TB3-3) may include, for example, information specifying the port mirror direction of the migration source port. In the initial state, however, the port mirror direction of the migration source port can be specified from, for example, the transmission flag and the reception flag of the mirror filter management table TB3-1.

The mirror filter management table TB3 may also store, for example, the mirror filter information on a port other than the port to be switched for the mirror port. The mirror filter information on a port other than the port to be switched for the mirror port may be managed in each host OS 240 using a table different from the mirror filter management table TB3.

(Functional Configuration Example of Management Device 201)

Figure 7:
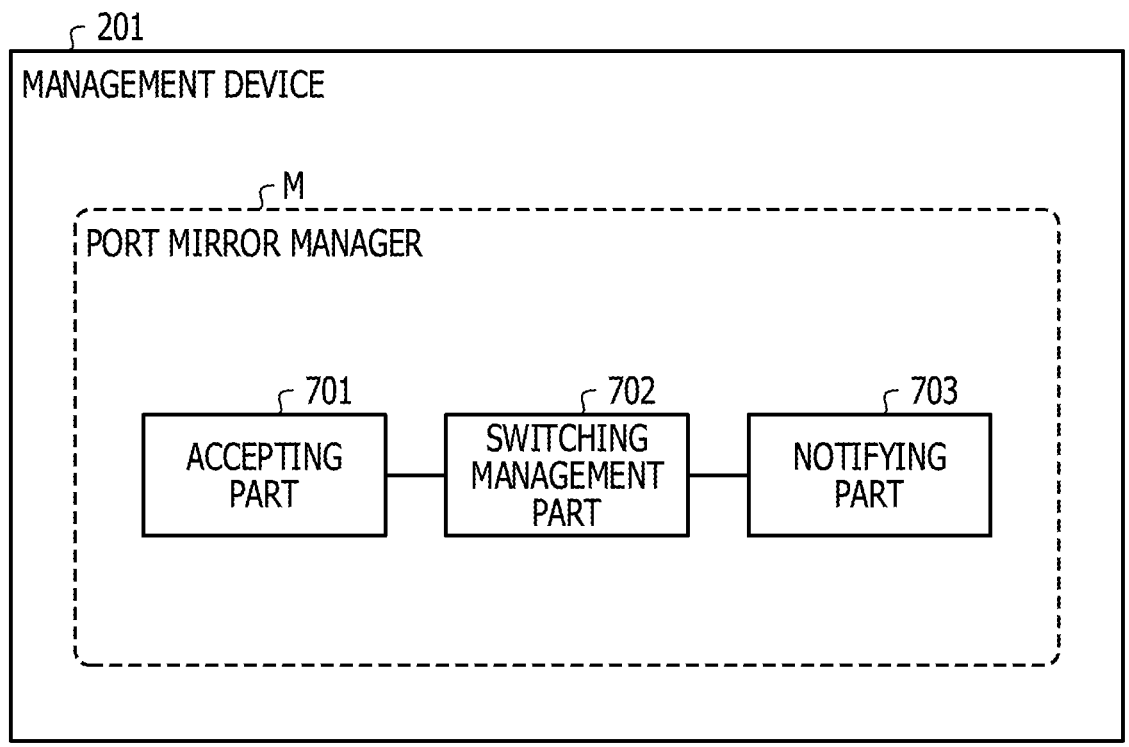
FIG. 7 is a block diagram illustrating a functional configuration example of a management device 201.

FIG. 7 is a block diagram illustrating a functional configuration example of the management device 201. In FIG. 7, the management device 201 has a configuration including an accepting part 701, a switching management part 702, and a notifying part 703. The accepting part 701 to the notifying part 703 are functional units included in the port mirror manager M. The accepting part 701 to the notifying part 703 have functions serving as a control part; for example, the functions of these parts are implemented by the CPU 301 executing a program stored in a storage device such as the memory 302 and the disk 305, or by the I/F 303 of the management device 201 illustrated in FIG. 3. The processing result of each functional unit is stored in, for example, a storage device such as the memory 302 and the disk 305 of the management device 201.

The accepting part 701 accepts a mirror port switching instruction in which the migration source port is designated. The mirror port switching instruction is an instruction for switching the mirror port. The mirror port switching instruction includes, for example, the port ID of the migration source port. For example, the accepting part 701 accepts the mirror port switching instruction by receiving the mirror port switching instruction from the administrator terminal 202.

The mirror port switching instruction may include, for example, the port ID of the migration destination port. For example, the accepting part 701 may accept a mirror port switching instruction in which the migration source port and the migration destination port are designated.

The switching management part 702 generates the mirror filter management table TB3 on the basis of the mirror port management table TB1 and the inter-port connection management table TB2. For example, in response to the acceptance of the mirror port switching instruction, the switching management part 702 searches the inter-port connection management table TB2 for the port ID of the migration destination port corresponding to the port ID of the migration source port included in the switching instruction. For example, the migration destination port is a port having a connection relationship with the migration source port.

As an example, it is assumed that the mirror port switching instruction includes the port ID "P2" of the migration source port. In this case, in the example in FIG. 5, the port IDs "P3 and P4" of the migration destination ports corresponding to the port ID "P2" of the migration source port are found from the inter-port connection management table TB2.

Although the migration destination port is specified from the inter-port connection management table TB2 in this example, the present invention is not limited to this case. For example, when the mirror port switching instruction includes the port ID of the migration destination port, the switching management part 702 may specify the included port ID as the port ID of the migration destination port.

Next, the switching management part 702 refers to the mirror port management table TB1 to specify the port mirror direction of the migration source port. Then, the switching management part 702 generates the mirror filter management table TB3 of the migration source port on the basis of the specified port mirror direction of the migration source port. In the example described above, the mirror filter management table TB3-1 (refer to FIG. 6) of the migration source port P2 is generated.

To give a more detailed explanation, for example, the port ID "P2" of the migration source port P2 is set in the port ID in the mirror filter management table TB3-1. The VM ID "VM2" of the virtual machine VM2 connected to the migration source port P2 is set in the SRC VM ID. The respective VM IDs "VM3 and VM4" of the virtual machines VM3 and VM4 connected to the migration destination ports P3 and P4 are set in the DST VM ID. Furthermore, since the port mirror direction of the migration source port P2 is "bidirectional", "True" is set in both of the transmission flag and the reception flag. As a result, the mirror filter information 610-1 and the mirror filter information 610-2 are stored as records in the mirror filter management table TB3-1.

The switching management part 702 also generates the mirror filter management table TB3 of the migration destination port. In the example described above, the mirror filter management tables TB3-2 and TB3-3 (refer to FIG. 6) are generated for the migration destination ports P3 and P4, respectively.

To give a more detailed explanation, for example, the port ID "P3" of the migration destination port P3 is set in the port ID in the mirror filter management table TB3-2. The VM ID "VM3" of the virtual machine VM3 connected to the migration destination port P3 is set in the SRC VM ID. The VM ID "VM2" of the virtual machine VM2 connected to the migration source port P2 is set in the DST VM ID. "False" is set in both of the transmission flag and the reception flag as an initial setting. As a result, the mirror filter information 620-1 is stored as a record in the mirror filter management table TB3-2. The mirror filter information 620-1 may include, for example, information specifying the port mirror direction "bidirectional" of the migration source port P2 before switching the mirror port.

The switching management part 702 transmits the generated mirror filter management table TB3 of the migration source port to the virtual switch 260 having the migration source port. The virtual switch 260 (host OS 240) having the migration source port is specified from, for example, the inter-port connection management table TB2. For example, the switching management part 702 transmits the generated mirror filter management table TB3-1 of the migration source port P2 to the virtual switch SW1 (host H1) having the migration source port P2.

The switching management part 702 also transmits the generated mirror filter management table TB3 of the migration destination port to the virtual switch 260 having the migration destination port. The host OS 240 of the virtual switch 260 having the migration destination port is specified from, for example, the inter-port connection management table TB2. For example, the switching management part 702 transmits the generated mirror filter management tables TB3-2 and TB3-3 of the migration destination ports P3 and P4 to the virtual switches SW2 and SW3 having the migration destination ports P3 and P4 (host H2 and H3), respectively.

In the following description, the virtual switch 260 having the migration source port is sometimes referred to as "migration source switch". In addition, the virtual switch 260 having the migration destination port is sometimes referred to as "migration destination switch".

The notifying part 703 notifies the migration source switch of a mirror switching instruction CI that specifies the migration source port and the migration destination port. The mirror switching instruction CI is an instruction for switching the mirror port from the migration source port to the migration destination port. The mirror switching instruction CI includes, for example, the port ID of the migration source port and the port ID of the migration destination port.

For example, in response to the transmission of the mirror filter management table TB3 to both of the migration source switch and the migration destination switch, the notifying part 703 transmits the mirror switching instruction CI to the migration source switch. For example, the notifying part 703 may call a functional unit of the migration destination switch (for example, a notification generating part 801 illustrated in FIG. 8 to be described later), by remote function call using the port ID of the migration destination port as a notification destination parameter.

(Functional Configuration Example of Information Processing Device PMi)

Figure 8:
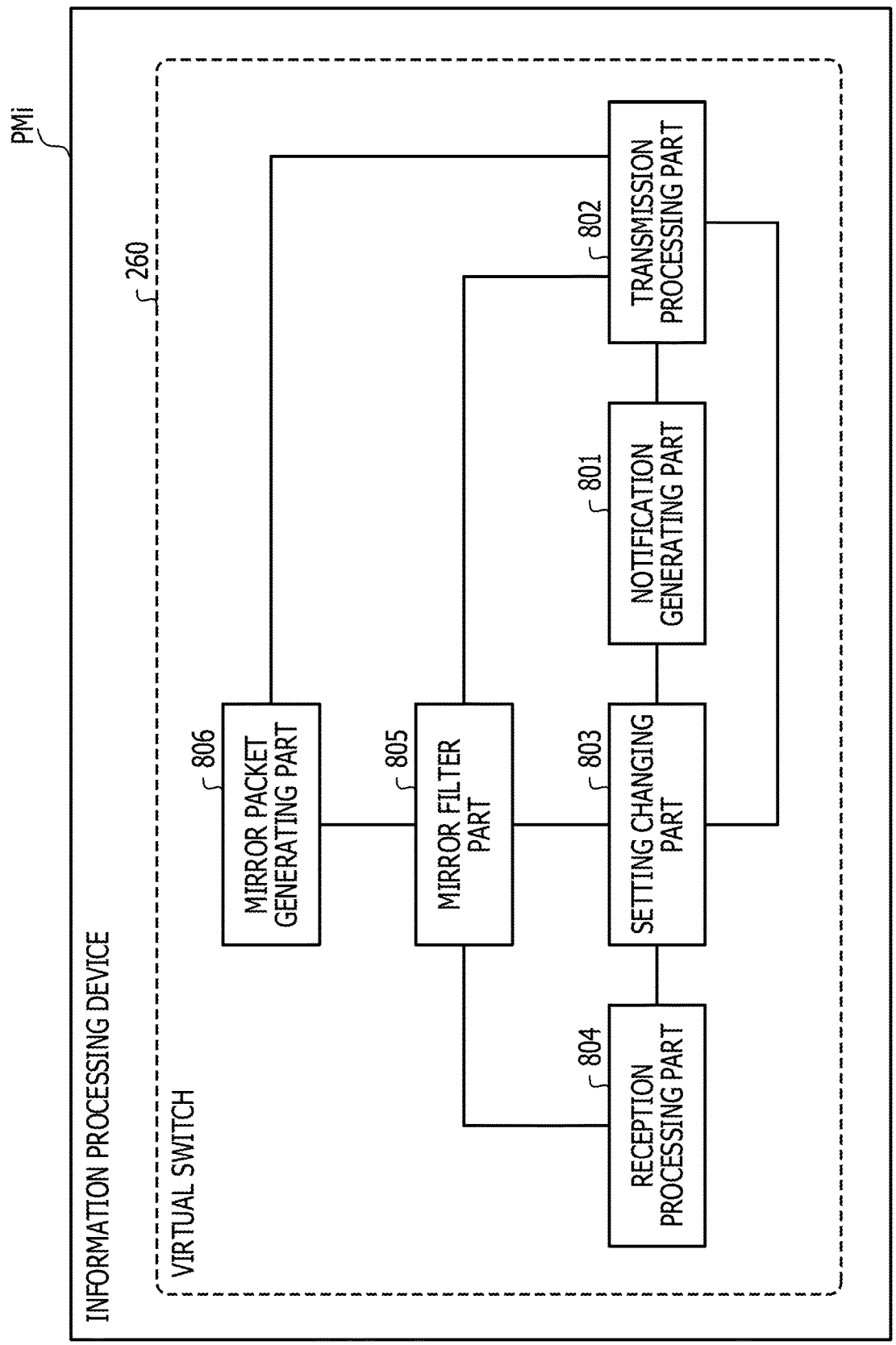
FIG. 8 is a block diagram illustrating a functional configuration example of the information processing device PMi.

FIG. 8 is a block diagram illustrating a functional configuration example of the information processing device PMi. In FIG. 8, the information processing device PMi has a configuration including the notification generating part 801, a transmission processing part 802, a setting changing part 803, a reception processing part 804, a mirror filter part 805, and a mirror packet generating part 806. The notification generating part 801 to the mirror packet generating part 806 are functional units included in the virtual switch 260. The notification generating part 801 to the mirror packet generating part 806 have functions serving as the control part; for example, the functions of these parts are implemented by the CPU 301 executing a program stored in a storage device such as the memory 302 and the disk 305, or by the I/F 303 of the information processing device PMi illustrated in FIG. 3. The processing result of each functional unit is stored in, for example, a storage device such as the memory 302 and the disk 305 of the information processing device PMi.

Migration Source Switch

First, a case where the virtual switch 260 operates as a migration source switch will be described. The migration source switch is the virtual switch 260 having a migration source port when the mirror port is switched.

The notification generating part 801 generates a mirror switching notification CN for the migration destination switch. For example, in response to the mirror switching instruction CI from the port mirror manager M, the notification generating part 801 generates the mirror switching notification CN for the migration destination switch having the migration destination port specified from the mirror switching instruction CI.

The mirror switching notification CN for the migration destination switch is a notification that requests the change of the mirror setting in the migration destination port and correlates to, for example, the "first mirror switching notification" described with reference to FIG. 1. The mirror switching notification CN includes, for example, the port ID of the migration source port and the port ID of the migration destination port included in the mirror switching instruction CI. The mirror switching notification CN may include the monitor port ID. The monitor port ID is a port ID of a port linked with the capture tool C of the information processing device PMm.

Here, a format example of the mirror switching notification CN will be described with reference to FIG. 9.

Figure 9:
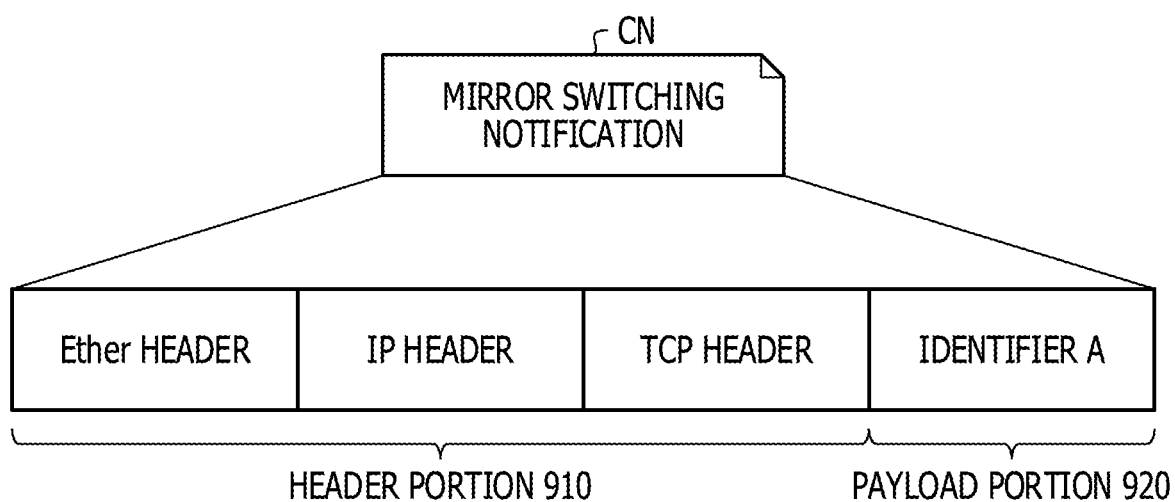
FIG. 9 is an explanatory diagram (No. 1) illustrating a format example of a mirror switching notification CN.

FIG. 9 is an explanatory diagram (No. 1) illustrating a format example of the mirror switching notification CN. In FIG. 9, the mirror switching notification CN includes a header portion 910 and a payload portion 920. The header portion 910 includes an Ether header, an IP header, and a transmission control protocol (TCP) header.

The payload portion 920 includes an identifier A that identifies the mirror switching notification CN. According to the identifier A, the mirror switching notification CN can be distinguished from a normal packet. The port ID of the migration source port and the port ID of the migration destination port are included in, for example, the header portion 910 (a transmission source port number and a destination port number of the TCP header). However, the payload portion 920 may include the port ID of the migration source port, the port ID of the migration destination port, and the monitor port ID.

Returning to the description of FIG. 8, the transmission processing part 802 performs a data transmission process. For example, the transmission processing part 802 transmits the mirror switching notification CN generated by the notification generating part 801 to the migration destination switch. To give a more detailed explanation, for example, the notification generating part 801 first writes the generated mirror switching notification CN to a transmission queue of the shared memory 290 (refer to FIG. 2).

Then, the notification generating part 801 writes a transmission notification to the ring buffer TX on the shared memory 290. The transmission notification includes, for example, the write destination address of the shared memory 290. In this case, when detecting the transmission notification written to the ring buffer TX, the transmission processing part 802 reads out the mirror switching notification CN from the write destination address of the shared memory 290 and performs a transmission process for the mirror switching notification CN to the migration destination switch.

The setting changing part 803 changes the mirror setting in the migration source port. For example, when the mirror switching notification CN is transmitted to the migration destination switch, the setting changing part 803 cancels the mirror setting for the transmission packet to the migration destination port in the migration source port. For example, the setting changing part 803 sets "False" in the transmission flag of an applicable record in the mirror filter management table TB3.

The applicable record in the mirror filter management table TB3 is a record corresponding to the combination of the migration source port and the migration destination port. For example, it is assumed that the mirror setting for the transmission packet to the migration destination port P3 is cancelled in the migration source port P2 of the migration source switch SW1. In this case, the setting changing part 803 sets "False" in the transmission flag of the mirror filter information 610-1 in the mirror filter management table TB3-1 illustrated in FIG. 6.

With this procedure, in the migration source switch SW1, at the timing when the mirror switching notification CN is transmitted to the migration destination switch SW2, a packet to be transmitted from the migration source port P2 to the migration destination port P3 thereafter is properly excluded from mirroring targets.

However, when the port mirror direction at the migration source port is selectively the input direction (reception), the setting changing part 803 does not perform the process of canceling the mirror setting for the transmission packet. The port mirror direction at the migration source port is specified from, for example, the transmission flag and the reception flag of the applicable record in the mirror filter management table TB3. For example, the setting changing part 803 may determine that the port mirror direction at the migration source port is selectively the input direction (reception) when "False" is set in the transmission flag of the applicable record in the mirror filter management table TB3.

The transmission processing part 802 may execute the transmission process for a packet to be transmitted next to the mirror switching notification CN from the migration source port after the process of canceling the mirror setting for the transmission packet is completed by the setting changing part 803. For example, the transmission processing part 802 may stop the transmission of the next packet until the setting change for port mirroring (in this case, the cancellation of the mirror setting for the transmission packet) is completed.

With this configuration, the next packet is reliably restrained from being transmitted to the migration destination switch during a period until the setting change for port mirroring is completed after the mirror switching notification CN is transmitted. The transmission processing part 802 may determine the completion of the setting change for port mirroring by, for example, inquiring the setting changing part 803 or referring to a database that manages the setting state of port mirroring in the virtual switch 260.

The reception processing part 804 performs a data reception process. For example, when detecting a reception notification (write destination address) written to the ring buffer RX on the shared memory 290 illustrated in FIG. 2, the reception processing part 804 reads out a packet from the write destination address of the shared memory 290. When the read-out packet is a normal packet, the reception processing part 804 performs a normal packet reception process.

On the other hand, when the read-out packet is the mirror switching notification CN from the migration destination switch, the reception processing part 804 notifies the setting changing part 803 of the mirror switching notification CN. The mirror switching notification CN from the migration destination switch is a notification indicating the change of the mirror setting in the migration destination port and correlates to, for example, the "second mirror switching notification" described with reference to FIG. 1.

The setting changing part 803 cancels the mirror setting for the received packet from the migration destination port in the migration source port in response to the mirror switching notification CN from the migration destination switch. For example, the setting changing part 803 sets "False" in the reception flag of an applicable record in the mirror filter management table TB3.

For example, it is assumed that the mirror setting for the received packet from the migration destination port P3 is cancelled in the migration source port P2 of the migration source switch SW1. In this case, the setting changing part 803 sets "False" in the reception flag of the mirror filter information 610-1 in the mirror filter management table TB3-1 illustrated in FIG. 6.

With this procedure, in the migration source switch SW1, at the timing when the mirror switching notification CN is received from the migration destination switch SW2, a packet to be received from the migration destination port P3 in the migration source port P2 thereafter is properly excluded from mirroring targets.

However, when the port mirror direction at the migration source port is selectively the output direction (transmission), the setting changing part 803 does not perform the process of canceling the mirror setting for the received packet. For example, the setting changing part 803 may determine that the port mirror direction at the migration source port is selectively the output direction (transmission) when "False" is set in the reception flag of the applicable record in the mirror filter management table TB3.

When the switching of the mirror port is completed, the setting changing part 803 transmits, to the port mirror manager M, a switching completion notification indicating that the switching of the mirror port has been completed. For example, the setting changing part 803 may transmit the switching completion notification to the port mirror manager M when the cancellation of the mirror setting for the received packet is completed.

The mirror filter part 805 determines whether or not a packet passing through the port of the migration source switch is a mirroring target. For example, the mirror filter part 805 acquires a packet passing through the migration source port. Next, the mirror filter part 805 acquires the address (a transmission source address or a destination address) from the header information of the acquired packet.

Then, the mirror filter part 805 refers to the mirror filter management table TB3 to specify the port mirror direction corresponding to the combination of the port ID of the migration source port and the address (the transmission source address or the destination address). The address (the transmission source address or the destination address) correlate to, for example, the VM ID of the virtual machine.

For example, when both of the transmission flag and the reception flag of the mirror filter information corresponding to the combination of the port ID and the address have "True", the mirror filter part 805 specifies the port mirror direction "bidirectional". When the transmission flag has "True" and the reception flag has "False", the mirror filter part 805 specifies the port mirror direction "output". When the transmission flag has "False" and the reception flag has "True", the mirror filter part 805 specifies the port mirror direction "input". When both of the transmission flag and the reception flag have "False", the mirror filter part 805 specifies the port mirror direction "-(Null)". The port mirror direction "-" indicates that mirroring is not performed.

Next, the mirror filter part 805 determines whether or not the direction of the acquired packet matches the specified port mirror direction. When the direction of the packet matches the port mirror direction, the mirror filter part 805 determines that the acquired packet is a mirroring target. Then, the mirror filter part 805 outputs the acquired packet to the mirror packet generating part 806. On the other hand, when the direction of the packet does not match the port mirror direction, the mirror filter part 805 determines that the acquired packet is not a mirroring target. In this case, the mirror filter part 805 does not output the acquired packet to the mirror packet generating part 806.

The mirror filter part 805 may process a port other than the migration source port in the same manner as the migration source port. At this time, when mirror filter information on a port other than a port to be switched for the mirror port is managed in a table different from the mirror filter management table TB3, the mirror filter part 805 also refers to the different table to specify the port mirror direction.

The mirror packet generating part 806 copies the packet output from the mirror filter part 805 to generate a mirror packet. At this time, the mirror packet generating part 806 sets, for example, the monitor ID in the port ID of the destination of the mirror packet. Then, the mirror packet generating part 806 writes the generated mirror packet to the transmission queue of the shared memory 290 and writes the transmission notification to the ring buffer TX on the shared memory 290.

As a result, when locating the transmission notification written to the ring buffer TX, the transmission processing part 802 reads out the mirror packet from the write destination address of the shared memory 290 and performs the transmission process for the mirror packet to the capture tool C.

Migration Destination Switch

Next, a case where the virtual switch 260 operates as a migration destination switch will be described. The migration destination switch is the virtual switch 260 having a migration destination port when the mirror port is switched. However, the description is sometimes omitted for the same part as the part described in the migration source switch.

The reception processing part 804 performs a data reception process. For example, when detecting the reception notification (write destination address) written to the ring buffer RX on the shared memory 290, the reception processing part 804 reads out a packet from the write destination address of the shared memory 290.

When the read-out packet is a normal packet, the reception processing part 804 performs a normal packet reception process. On the other hand, when the read-out packet is the mirror switching notification CN from the migration source switch, the reception processing part 804 notifies the setting changing part 803 of the mirror switching notification CN from the migration source switch.

The setting changing part 803 changes the mirror setting in the migration destination port. For example, the setting changing part 803 makes the mirror setting for the received packet from the migration source port in the migration destination port in response to the mirror switching notification CN from the migration source switch. For example, the setting changing part 803 sets "True" in the reception flag of an applicable record in the mirror filter management table TB3. Then, the setting changing part 803 outputs the mirror switching notification CN from the migration source switch to the notification generating part 801.

For example, it is assumed that the mirror setting for the received packet from the migration source port P1 is made in the migration destination port P3 of the migration destination switch SW2. In this case, the setting changing part 803 sets "True" in the reception flag of the mirror filter information 620-1 in the mirror filter management table TB3-2 illustrated in FIG. 6.

With this procedure, in the migration destination switch SW2, at the timing when the mirror switching notification CN is received from the migration source switch SW1, a packet to be received from the migration source port P2 in the migration destination port P3 thereafter is properly treated as a mirroring target.

However, when the port mirror direction at the migration destination port is selectively the output direction (transmission), the setting changing part 803 does not make the mirror setting for the received packet. The information specifying the port mirror direction at the migration destination port may be included in, for example, the mirror filter management table TB3. The port mirror direction at the migration destination port is the same as the port mirror direction at the migration destination port before the mirror port is switched.

The notification generating part 801 generates a mirror switching notification CN for the migration source switch. For example, in response to the mirror switching notification CN from the migration source switch, the notification generating part 801 generates the mirror switching notification CN for the migration source switch having the migration source port specified from the mirror switching notification CN.

The transmission processing part 802 transmits the mirror switching notification CN generated by the notification generating part 801 to the migration source switch. To give a more detailed explanation, for example, the notification generating part 801 first writes the generated mirror switching notification CN to the transmission queue of the shared memory 290. Then, the notification generating part 801 writes the transmission notification to the ring buffer TX on the shared memory 290. In this case, when locating the transmission notification written to the ring buffer TX, the transmission processing part 802 reads out the mirror switching notification CN from the write destination address of the shared memory 290 and performs the transmission process for the mirror switching notification CN to the migration source switch.

When the mirror switching notification CN is transmitted to the migration source switch, the setting changing part 803 makes the mirror setting for the transmission packet to the migration source port in the migration destination port. For example, the setting changing part 803 sets "True" in the transmission flag of an applicable record in the mirror filter management table TB3.

For example, it is assumed that the mirror setting for the transmission packet to the migration source port P2 is made in the migration destination port P3 of the migration destination switch SW2. In this case, the setting changing part 803 sets "True" in the transmission flag of the mirror filter information 620-1 in the mirror filter management table TB3-2 illustrated in FIG. 6.

With this procedure, in the migration destination switch SW2, at the timing when the mirror switching notification CN is transmitted to the migration source switch SW1, a packet to be transmitted from the migration destination port P3 to the migration source port P2 thereafter is properly treated as a mirroring target.

However, when the port mirror direction at the migration destination port is selectively the input direction (reception), the setting changing part 803 does not make the mirror setting for the transmission packet.

The transmission processing part 802 may execute the transmission process for a packet to be transmitted next to the mirror switching notification CN from the migration destination port after the process of making the mirror setting for the transmission packet is completed by the setting changing part 803. For example, the transmission processing part 802 may stop the transmission of the next packet until the setting change for port mirroring (in this case, the mirror setting for the transmission packet) is completed.

With this configuration, the next packet is reliably restrained from being transmitted to the migration source switch during a period until the setting change for port mirroring is completed after the mirror switching notification CN is transmitted.

The mirror filter part 805 determines whether or not a packet passing through the port of the migration destination switch is a mirroring target. For example, the mirror filter part 805 acquires a packet passing through the migration destination port. Next, the mirror filter part 805 acquires the address (the transmission source address or the destination address) from the header information of the acquired packet. Then, the mirror filter part 805 refers to the mirror filter management table TB3 to specify the port mirror direction corresponding to the combination of the port ID of the migration destination port and the address (the transmission source address or the destination address). Next, the mirror filter part 805 determines whether or not the direction of the acquired packet matches the specified port mirror direction.

When the direction of the packet matches the port mirror direction, the mirror filter part 805 determines that the acquired packet is a mirroring target. Then, the mirror filter part 805 outputs the acquired packet to the mirror packet generating part 806. On the other hand, when the direction of the packet does not match the port mirror direction, the mirror filter part 805 determines that the acquired packet is not a mirroring target. In this case, the mirror filter part 805 does not output the acquired packet to the mirror packet generating part 806.

The mirror filter part 805 may process a port other than the migration destination port in the same manner as the migration destination port.

(Mirror Switching Notification CN in Consideration of Packet Overtaking)

Next, the mirror switching notification CN in consideration of packet overtaking will be described. If there is a network instrument such as a router in the middle of the communication, packets transmitted and received between the migration source port and the migration destination port are overtaken by each other in some cases under conditions such as packet priority. Therefore, there is a case where the mirror switching notification CN is overtaken by a packet transmitted later than the mirror switching notification CN.

In view of this case, the mirror switching notification CN may be set with a priority higher than the priority of a normal packet, for example, the highest priority, and may include information indicating the transmission order of a packet transmitted from a port (the migration source port or the migration destination port) immediately before the mirror switching notification CN. For example, a sequence number in the TCP header can be used as the information indicating the packet transmission order.

Here, a format example of the mirror switching notification CN including the sequence number of the packet transmitted immediately before will be described with reference to FIG. 10.

Figure 10:
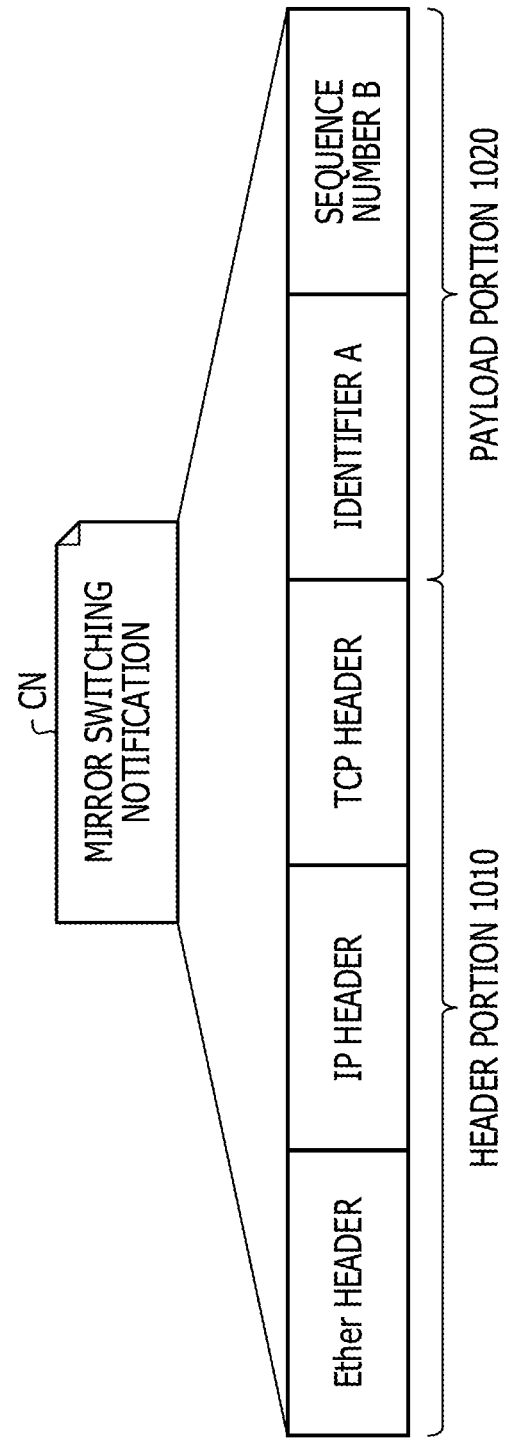
FIG. 10 is an explanatory diagram (No. 2) illustrating a format example of the mirror switching notification CN.

FIG. 10 is an explanatory diagram (No. 2) illustrating a format example of the mirror switching notification CN. In FIG. 10, the mirror switching notification CN includes a header portion 1010 and a payload portion 1020. The header portion 1010 includes an Ether header, an IP header, and a TCP header. The payload portion 1020 includes an identifier A that identifies the mirror switching notification CN, and a sequence number B of a packet transmitted immediately before the mirror switching notification CN.

The sequence number B is information indicating the transmission order of a packet transmitted from a port (the migration source port or the migration destination port) immediately before the mirror switching notification CN and is, for example, a sequence number included in the TCP header of the transmitted packet.

In this case, among the received packets received after the mirror switching notification CN in the migration source port, the migration source switch performs mirroring of a received packet whose sequence number indicating the transmission order of the transmission from the migration destination port is equal to or less than the sequence number B. With this process, even if the mirror setting for the received packet is canceled in response to the mirror switching notification CN from the migration destination switch, a packet overtaken by the mirror switching notification CN in the middle of the communication is normally mirrored and a mirroring failure (packet loss) is reliably restrained.

In addition, among the received packets received after the mirror switching notification CN in the migration destination port, the migration destination switch excludes, from mirroring targets, a received packet whose sequence number indicating the transmission order of the transmission from the migration source port is equal to or less than the sequence number B. With this process, even if the mirror setting for the received packet is made in response to the mirror switching notification CN from the migration source switch, a packet overtaken by the mirror switching notification CN in the middle of the communication is properly excluded from mirroring targets and mirror packet duplication is reliably restrained.

Here, an example of a mirroring process in a case where a packet transmitted from the migration source switch to the migration destination switch is overtaken will be described with reference to FIG. 11.

Figure 11:
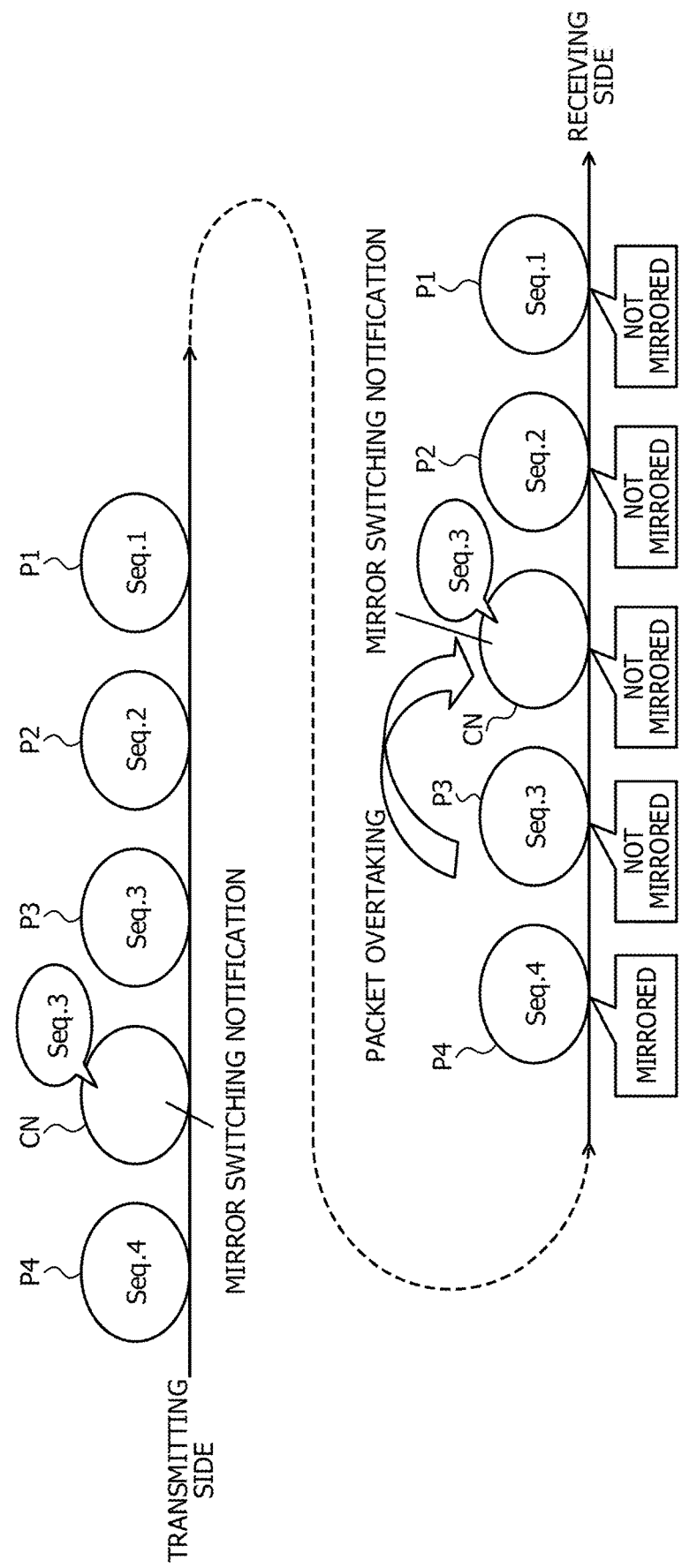
FIG. 11 is an explanatory diagram illustrating an example of a mirroring process when packet overtaking occurs.

FIG. 11 is an explanatory diagram illustrating an example of a mirroring process when packet overtaking occurs. In FIG. 11, packets are transmitted from a transmitting side (migration source switch) to a receiving side (migration destination switch) in the order of "packet P1 packet P2 packet P3 mirror switching notification CN packet P4".

"Seq. #" in FIG. 11 denotes a sequence number indicating the transmission order of the packets transmitted from the migration source port of the migration source switch (#=1, 2, 3, 4). The mirror switching notification CN includes the sequence number B "Seq. 3" of the packet P3 transmitted immediately before the mirror switching notification CN.

In this example, it is assumed that the packet P3 is overtaken by the mirror switching notification CN in the middle of the communication. For this reason, the packet P3 originally supposed to reach the receiving side (migration destination switch) first reaches the receiving side (migration destination switch) after the mirror switching notification CN.

In this case, the receiving side (migration destination switch) makes the mirror setting for the received packet at the timing when the mirror switching notification CN is received from the transmitting side (migration source switch). However, for a packet received after the mirror switching notification CN, the receiving side (migration destination switch) makes comparison with the sequence number "Seq. 3" included in the mirror switching notification CN.

For example, the receiving side (migration destination switch) compares the sequence number "Seq. 3" of the packet P3 received after the mirror switching notification CN, with the sequence number B "Seq. 3" included in the mirror switching notification CN. In this example, the sequence number "Seq. 3" of the packet P3 is equal to or less than the sequence number B "Seq. 3". Therefore, the receiving side (migration destination switch) excludes the packet P3 from mirroring targets.

The receiving side (migration destination switch) also compares the sequence number "Seq. 4" of the packet P4 received after the mirror switching notification CN, with the sequence number B "Seq. 3" included in the mirror switching notification CN. In this example, the sequence number "Seq. 4" of the packet P4 is greater than the sequence number B "Seq. 3". Therefore, the receiving side (migration destination switch) treats the packet P4 as a mirroring target.

(Specific Example of Port Switching Process)

Next, a specific example of a port switching process will be described with reference to FIGS. 12 and 13.

Figure 12:
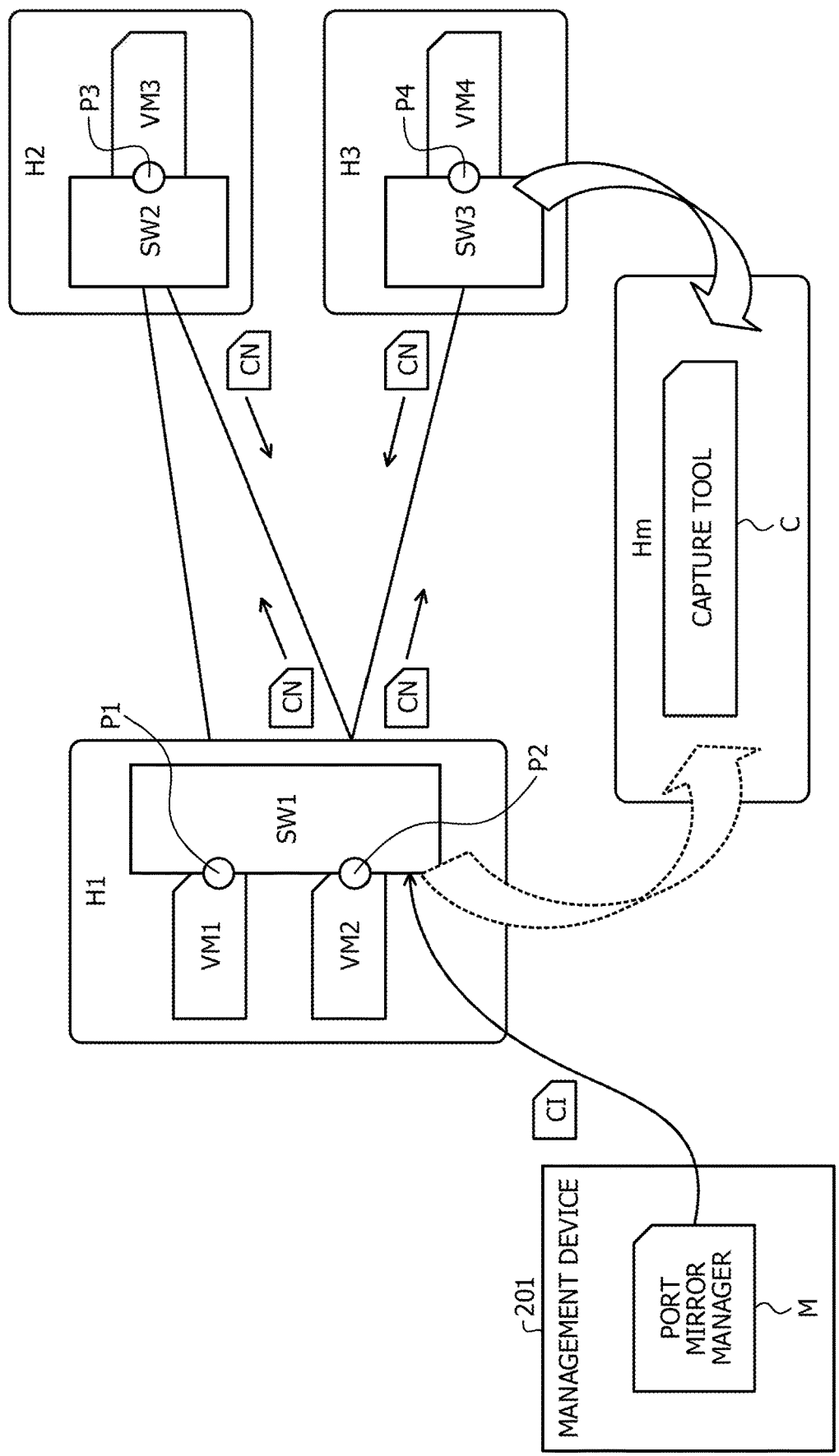
FIG. 12 is an explanatory diagram illustrating an example of a connection relationship between VMs.

FIG. 12 is an explanatory diagram illustrating an example of a connection relationship between VMs. In FIG. 12, a host H1, a host H2, a host H3, a host Hm, and the management device 201 are illustrated. A virtual machine VM3 is operating on the host H2. A virtual machine VM4 is operating on the host H3. The capture tool C is operating on the host Hm.

A virtual machine VM1 communicates with the virtual machine VM3 via a port P1. A virtual machine VM2 communicates with the virtual machine VM3 via a port P2. The virtual machine VM2 also communicates with the virtual machine VM4 via the port P2. The virtual machine VM3 communicates with the virtual machines VM1 and VM2 via a port P3. The virtual machine VM4 communicates with the virtual machine VM2 via a port P4.

The port P2 is a mirror port. For example, a virtual switch SW1 performs mirroring of packets transmitted and received between the VM2 and the VM3 at the port P2. The virtual switch SW1 also performs mirroring of packets transmitted and received between the VM2 and the VM4 at the port P2.

Hereinafter, an operation example of each module (the port mirror manager M and virtual switches SW1 to SW3) will be described with reference to FIG. 13 by taking, as an example, a case where the mirror port is switched from the port P2 to the respective ports P3 and P4.

Figure 13:
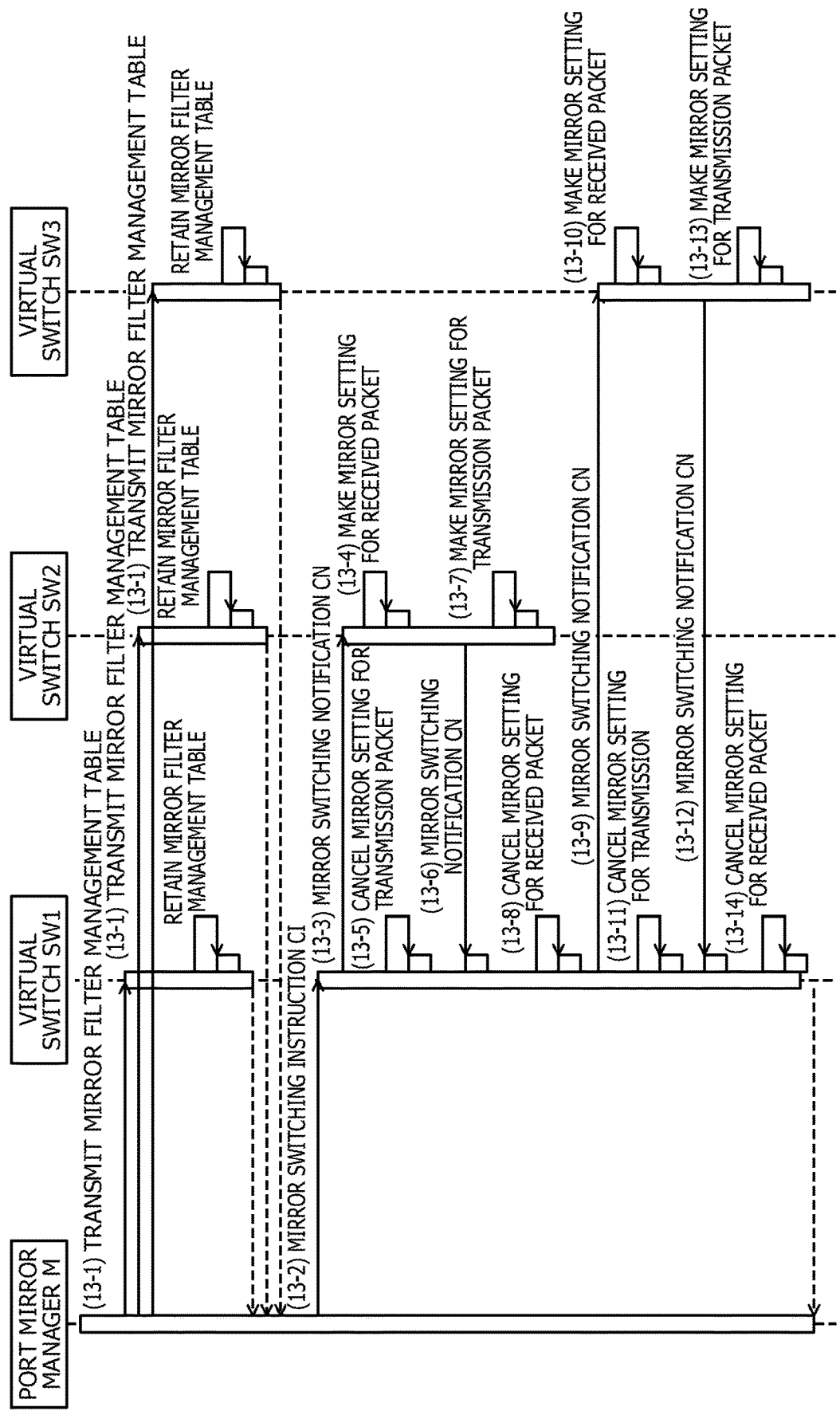
FIG. 13 is a sequence diagram illustrating an operation example of each module when a mirror port is switched.

FIG. 13 is a sequence diagram illustrating an operation example of each module when the mirror port is switched. (13-1) The port mirror manager M transmits the mirror filter management tables TB3-1 to TB3-3 (for example, refer to FIG. 6) to the virtual switches SW1 to SW3 of the hosts H1 to H3, respectively, according to the mirror port switching instruction from the administrator terminal 202.

As a result, the mirror filter management tables TB3-1 to TB3-3 are retained in the virtual switches SW1 to SW3, respectively. Then, a completion response indicating that the retention process for the mirror filter management tables TB3-1 to TB3-3 has been completed is transmitted from the respective virtual switches SW1 to SW3 to the port mirror manager M. In FIG. 13, dotted arrows indicate the completion responses of various processes.

(13-2) The port mirror manager M notifies the virtual switch SW1 of the mirror switching instruction CI. The mirror switching instruction CI is an instruction for switching the mirror port from the port P2 to the respective ports P3 and P4.

(13-3) In response to the mirror switching instruction CI from the port mirror manager M, the virtual switch SW1 transmits the mirror switching notification CN to the virtual switch SW2 having the migration destination port P3.

(13-4) In response to the mirror switching notification CN from the virtual switch SW1, the virtual switch SW2 makes the mirror setting for the received packet from the migration source port P2 in the migration destination port P3.

(13-5) In response to the transmission of the mirror switching notification CN to the virtual switch SW2, the virtual switch SW1 cancels the mirror setting for the transmission packet to the migration destination port P3 in the migration source port P2.

(13-6) When the mirror setting for the received packet from the migration source port P2 is completed in the migration destination port P3, the virtual switch SW2 transmits the mirror switching notification CN to the virtual switch SW1 having the migration source port P2.

(13-7) In response to the transmission of the mirror switching notification CN to the virtual switch SW1, the virtual switch SW2 makes the mirror setting for the transmission packet to the migration source port P2 in the migration destination port P3.

(13-8) In response to the reception of the mirror switching notification CN from the virtual switch SW2, the virtual switch SW1 cancels the mirror setting for the received packet from the migration destination port P3 in the migration source port P2.

(13-9) The virtual switch SW1 transmits the mirror switching notification CN to the virtual switch SW3 having the migration destination port P4.

(13-10) In response to the mirror switching notification CN from the virtual switch SW1, the virtual switch SW3 makes the mirror setting for the received packet from the migration source port P2 in the migration destination port P4.

(13-11) In response to the transmission of the mirror switching notification CN to the virtual switch SW3, the virtual switch SW1 cancels the mirror setting for the transmission packet to the migration destination port P4 in the migration source port P2.

(13-12) When the mirror setting for the received packet from the migration source port P2 is completed in the migration destination port P4, the virtual switch SW3 transmits the mirror switching notification CN to the virtual switch SW1 having the migration source port P2.

(13-13) In response to the transmission of the mirror switching notification CN to the virtual switch SW1, the virtual switch SW3 makes the mirror setting for the transmission packet to the migration source port P2 in the migration destination port P4.

(13-14) In response to the reception of the mirror switching notification CN from the virtual switch SW3, the virtual switch SW1 cancels the mirror setting for the received packet from the migration destination port P4 in the migration source port P2. Then, the virtual switch SW1 transmits, to the port mirror manager M, a completion response indicating that the switching of the mirror port has been completed.

With this procedure, the mirror port is reliably switched from the port P2 to the respective ports P3 and P4.

Here, a transition example of the mirror setting will be described by taking, as an example, packets transmitted and received between the virtual machines VM2 and VM3 illustrated in FIG. 12. In this example, however, it is assumed that there is no packet overtaking or loss of the mirror switching notification CN.

Figure 14:
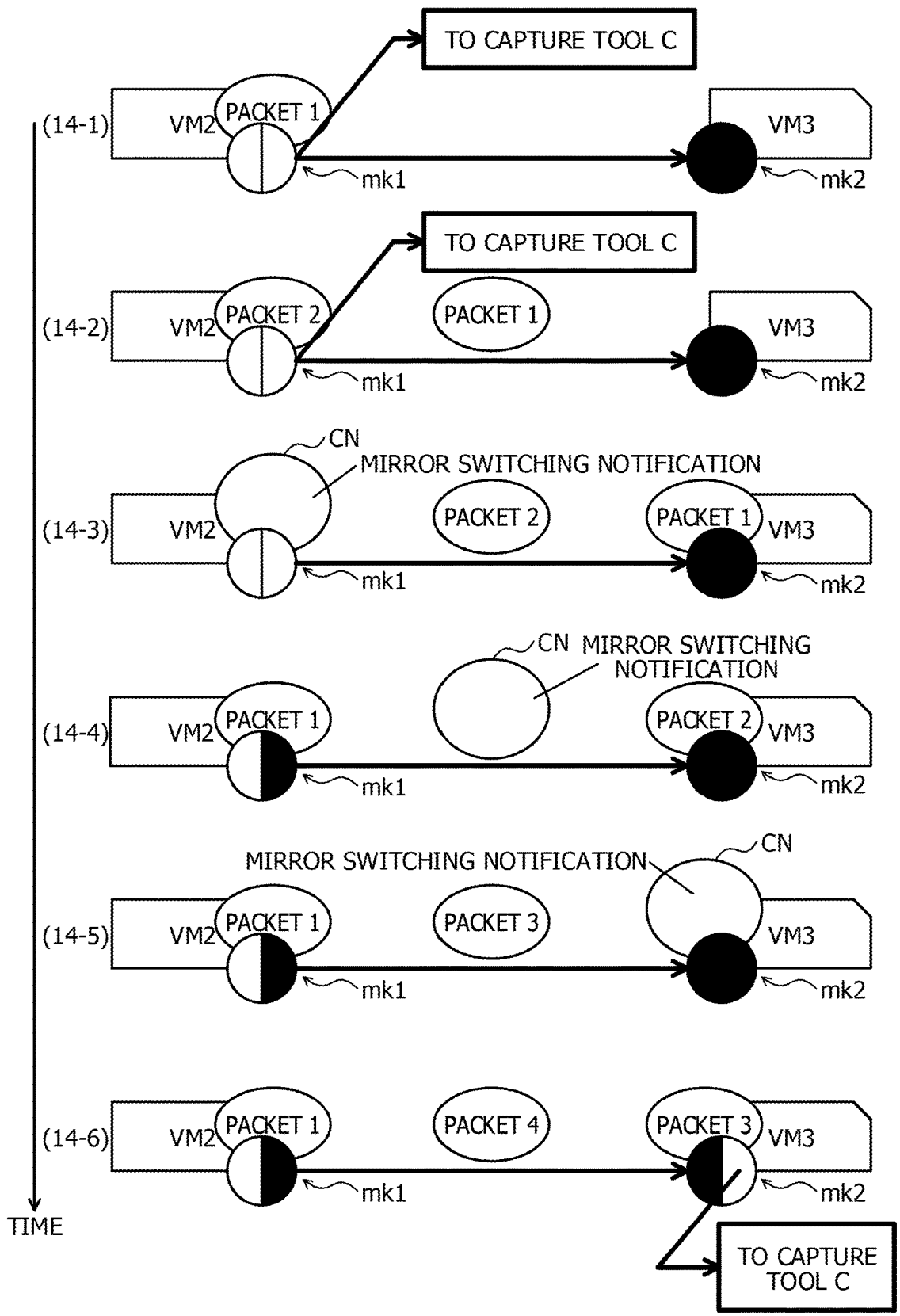
FIG. 14 is an explanatory diagram (No. 1) illustrating the flow of packets transmitted and received between virtual machines.
Figure 15:
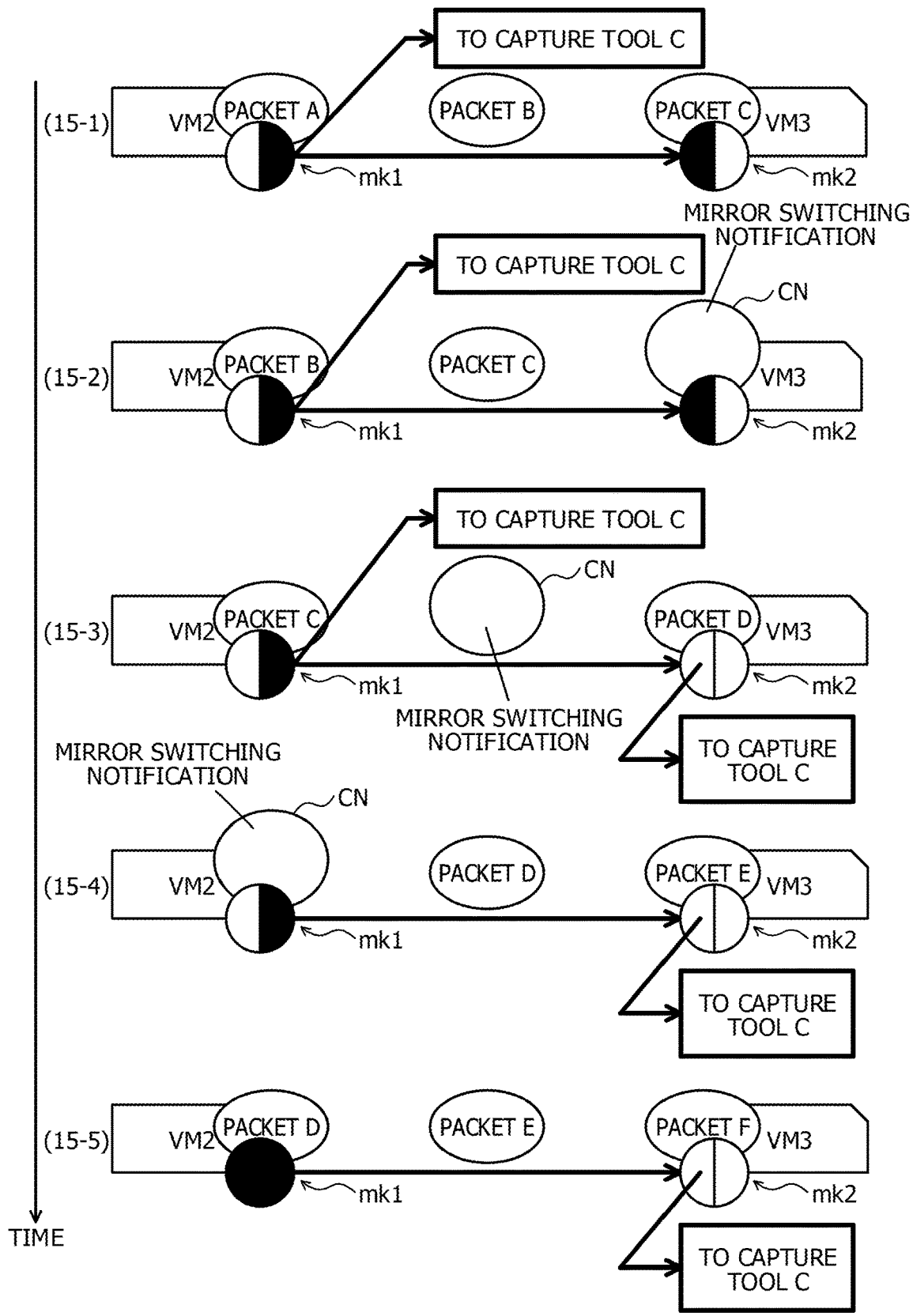
FIG. 15 is an explanatory diagram (No. 2) illustrating the flow of packets transmitted and received between virtual machines.

FIGS. 14 and 15 are explanatory diagrams illustrating the flow of packets transmitted and received between the virtual machines. In FIGS. 14 and 15, a mark mk1 indicates the state of the mirror setting in the migration source port P2 (refer to FIG. 12). A mark mk2 indicates the state of the mirror setting in the migration destination port P3 (refer to FIG. 12).

Each of the marks mk1 and mk2 is a figure in which a circle is divided into two equal portions. When a semicircle is white, this state indicates that the mirror setting is kept ON. When a semicircle is black, this state indicates that the mirror setting is kept OFF. A semicircle on the right side indicates the state of the mirror setting for a packet transmitted from the virtual machine VM2 to the virtual machine VM3. A semicircle on the left side indicates the state of the mirror setting for a packet transmitted from the virtual machine VM3 to the virtual machine VM2.

In (14-1), the semicircle of the mark mk1 on the right side is white. Therefore, a packet 1 transmitted from the virtual machine VM2 to the virtual machine VM3 is mirrored at the migration source port P2 and sent to the capture tool C.

In (14-2), the semicircle of the mark mk1 on the right side is white. Therefore, a packet 2 transmitted from the virtual machine VM2 to the virtual machine VM3 is mirrored at the migration source port P2 and sent to the capture tool C.

In (14-3), the mirror switching notification CN is transmitted from the side of the virtual machine VM2 (virtual switch SW1) to the side of the virtual machine VM3 (virtual switch SW3).

In (14-4), the semicircle of the mark mk1 on the right side has turned black. For example, in response to the transmission of the mirror switching notification CN, the mirror setting for the transmission packet to the migration destination port P3 has been cancelled in the migration source port P2. Therefore, a packet 3 transmitted from the virtual machine VM2 to the virtual machine VM3 is excluded from mirroring targets.

In (14-5), the mirror switching notification CN from the side of the virtual machine VM2 (virtual switch SW1) is received at the side of the virtual machine VM3 (virtual switch SW3).

In (14-6), the semicircle of the mark mkt on the right side has turned white. For example, in response to the reception of the mirror switching notification CN, the mirror setting for the received packet from the migration source port P2 has been made in the migration destination port P3. Therefore, the packet 3 transmitted from the virtual machine VM2 to the virtual machine VM3 is mirrored at the migration destination port P3 and sent to the capture tool C.

In (15-1), the semicircle of the mark mk1 on the left side is white. Therefore, a packet A from the virtual machine VM3 received by the virtual machine VM2 is mirrored at the migration source port P2 and sent to the capture tool C.

In (15-2), the mirror switching notification CN is transmitted from the side of the virtual machine VM3 (virtual switch SW3) to the side of the virtual machine VM2 (virtual switch SW1).

In (15-3), the semicircle of the mark mkt on the left side has turned white. For example, in response to the transmission of the mirror switching notification CN, the mirror setting for the transmission packet to the migration source port P2 has been made in the migration destination port P3. Therefore, a packet D transmitted from the virtual machine VM3 to the virtual machine VM2 is mirrored at the migration destination port P3 and sent to the capture tool C.

In (15-4), the mirror switching notification CN from the side of the virtual machine VM3 (virtual switch SW3) is received at the side of the virtual machine VM2 (virtual switch SW1).

In (15-5), the semicircle of the mark mk1 on the left side has turned black. For example, in response to the reception of the mirror switching notification CN, the mirror setting for the received packet from the migration destination port P3 has been cancelled in the migration source port P2. Therefore, the packet D received by the virtual machine VM2 is excluded from mirroring targets.

As described above, by changing the mirror settings in the migration source port P2 and the migration destination port P3 at the timing when the mirror switching notification CN is transmitted and received, the mirror port is reliably switched without causing packet loss or duplication.

(Mirror Port Switching Management Process Procedure of Management Device 201)

Next, the mirror port switching management process procedure of the management device 201 will be described with reference to FIG. 16. The mirror port switching management process is executed by the port mirror manager M of the management device 201.

Figure 16:
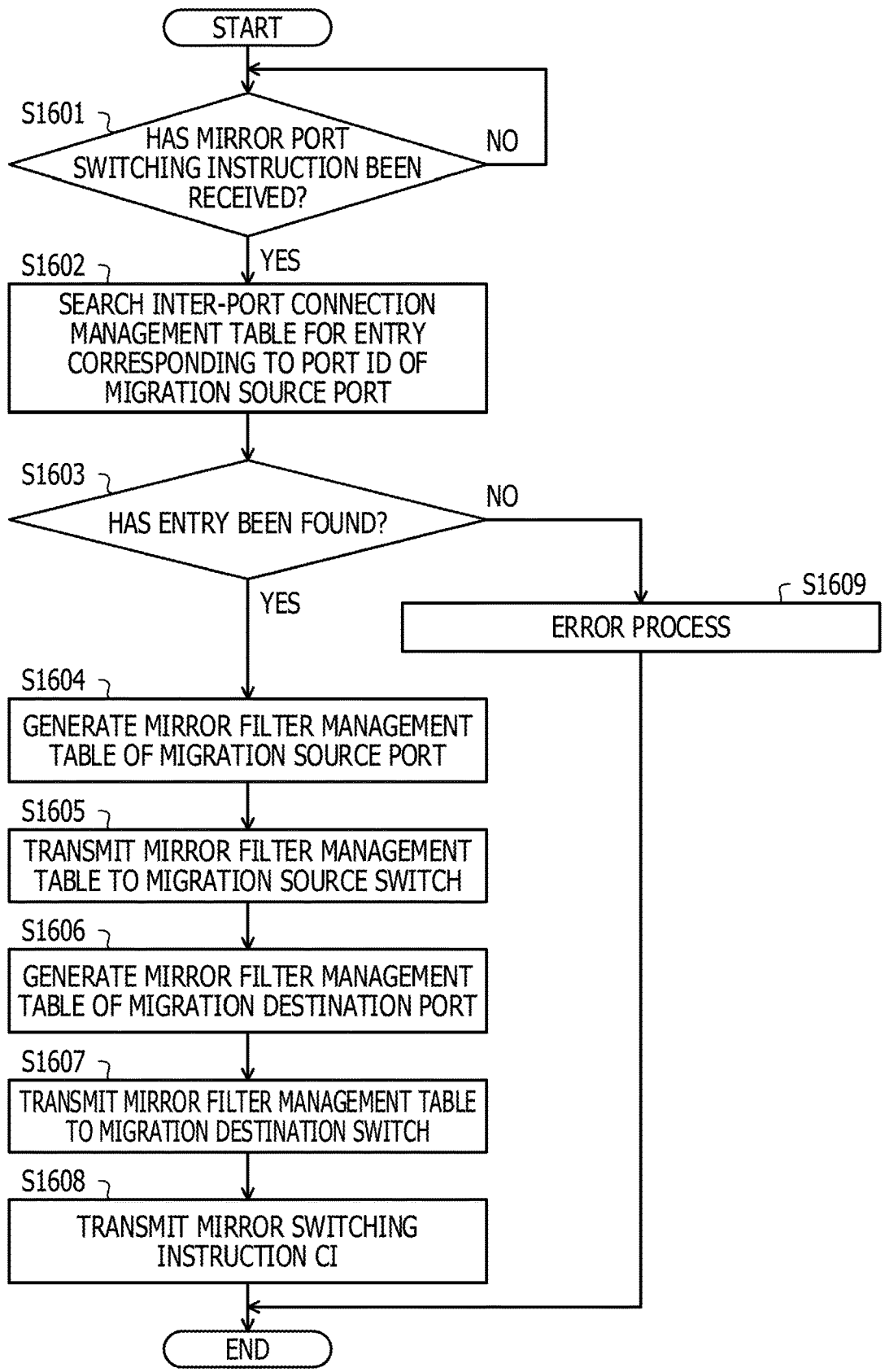
FIG. 16 is a flowchart illustrating an example of a mirror port switching management process procedure of the management device 201.

FIG. 16 is a flowchart illustrating an example of the mirror port switching management process procedure of the management device 201. In the flowchart in FIG. 16, first, the port mirror manager M of the management device 201 determines whether or not the mirror port switching instruction has been received from the administrator terminal 202 (step S1601). At this point, the port mirror manager M waits to receive the mirror port switching instruction (step S1601: No).

Then, when receiving the mirror port switching instruction (step S1601: Yes), the port mirror manager M searches the inter-port connection management table TB2 for an entry corresponding to the port ID of the migration source port (step S1602). The port ID of the migration source port is included in the mirror port switching instruction. Next, the port mirror manager M determines whether or not an entry corresponding to the port ID of the migration source port has been found (step S1603).

At this point, when the entry has been found (step S1603: Yes), the port mirror manager M generates the mirror filter management table TB3 of the migration source port on the basis of the mirror port management table TB1 and the inter-port connection management table TB2 (step S1604). Then, the port mirror manager M transmits the mirror filter management table TB3 of the migration source port to the migration source switch having the migration source port (step S1605).

Next, the port mirror manager M generates the mirror filter management table TB3 of the migration destination port on the basis of the mirror port management table TB1 and the inter-port connection management table TB2 (step S1606). Then, the port mirror manager M transmits the mirror filter management table TB3 of the migration destination port to the migration destination switch having the migration destination port (step S1607).

Next, the port mirror manager M transmits the mirror switching instruction CI that specifies the migration source port and the migration destination port to the migration source switch using the port ID of the migration destination port as a notification destination parameter (step S1608) and ends the series of processes according to this flowchart.

With this step, in response to the mirror port switching instruction from the administrator terminal 202, the migration source switch is reliably notified of the mirror switching instruction CI for switching the mirror port from the migration source port to the migration destination port.

When an entry corresponding to the port ID of the migration source port has not been found in step S1603 (step S1603: No), the port mirror manager M executes an error process (step S1609) and ends the series of processes according to this flowchart. The error process is, for example, a process of notifying the administrator terminal 202 that there is no port to be switched.

(Various Process Procedures of Information Processing Device PMi)

Next, various process procedures of the information processing device PMi will be described with reference to FIGS. 17 to 21. Various processes of the information processing device PMi described below are executed by the virtual switch 260 (the migration source switch or the migration destination switch) of the information processing device PMi.

Mirror Switching Notification Generation Process Procedure

First, a mirror switching notification generation process procedure of the information processing device PMi will be described with reference to FIG. 17. The mirror switching notification generation process is called by the mirror switching instruction CI from the port mirror manager M or in step S1912 illustrated in FIG. 19 described later.

Figure 17:
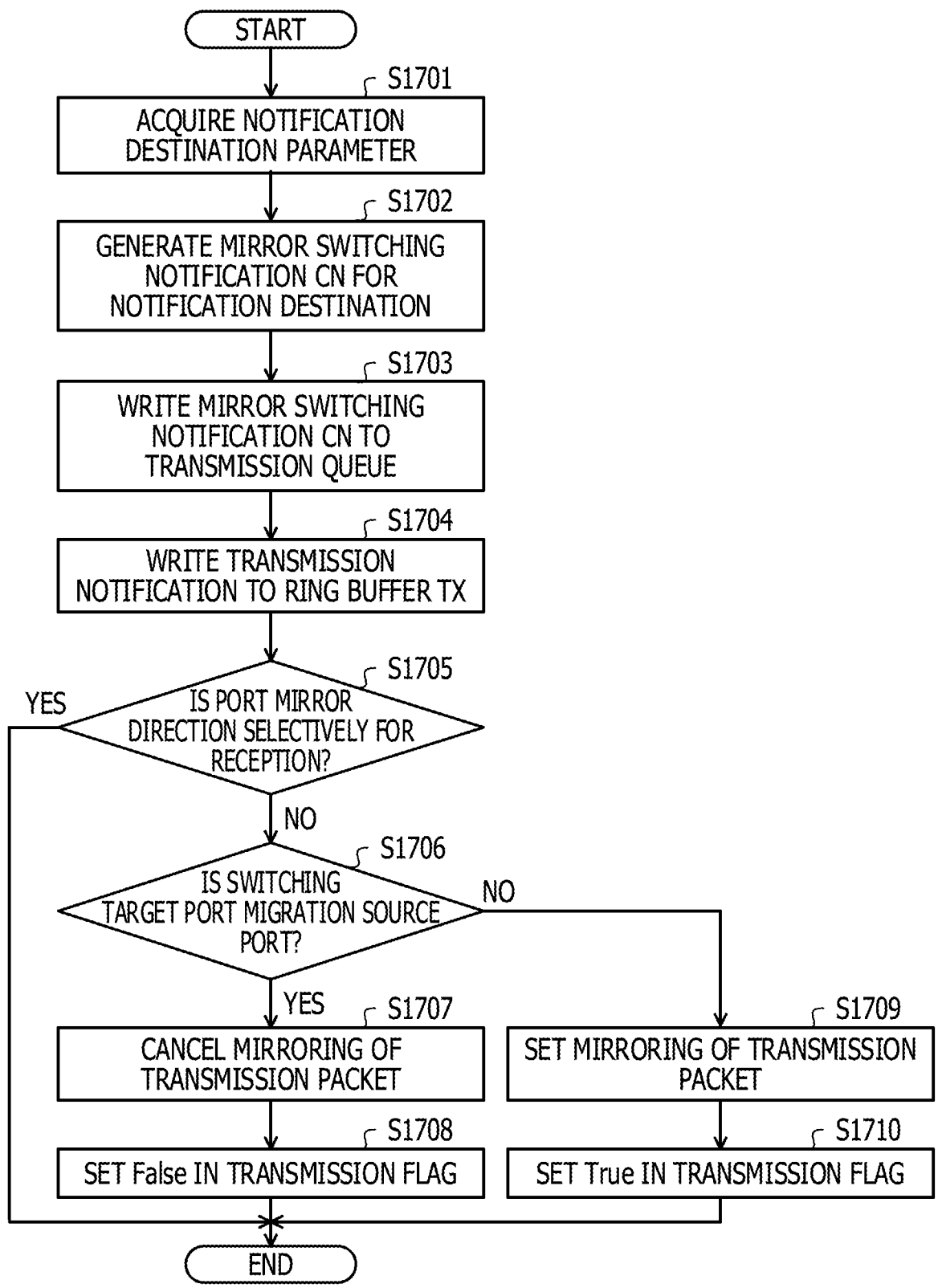
FIG. 17 is a flowchart illustrating an example of a mirror switching notification generation process procedure of the information processing device PMi.

FIG. 17 is a flowchart illustrating an example of the mirror switching notification generation process procedure of the information processing device PMi. In the flowchart in FIG. 17, first, the virtual switch 260 of the information processing device PMi acquires a notification destination parameter (step S1701). When the mirror switching notification generation process is activated in response to the mirror switching instruction CI from the port mirror manager M, the port ID of the migration destination port serves as the notification destination parameter. When the mirror switching notification generation process is activated in response to the mirror switching notification CN from the migration source switch, the port ID of the migration source port serves as the notification destination parameter.

Next, the virtual switch 260 generates the mirror switching notification CN for the notification destination on the basis of the acquired notification destination parameter (step S1702). Then, the virtual switch 260 writes the generated mirror switching notification CN to the transmission queue of the shared memory 290 (step S1703).

Next, the virtual switch 260 writes the transmission notification to the ring buffer TX on the shared memory 290 (step S1704). Then, the virtual switch 260 determines whether or not the port mirror direction is selectively for reception (step S1705). The port mirror direction correlates to the port mirror direction of the migration source port before the mirror port is switched. At this point, when the port mirror direction is selectively for reception (step S1705: Yes), the virtual switch 260 ends the series of processes according to this flowchart.

On the other hand, when the port mirror direction is not selectively for reception (step S1705: No), the virtual switch 260 determines whether or not the switching target port included in the virtual switch 260 is the migration source port (step S1706). At this point, when the switching target port is the migration source port (step S1706: Yes), the virtual switch 260 cancels the mirror setting for the transmission packet to the migration destination port in the migration source port (step S1707).

Then, the virtual switch 260 sets "False" in the transmission flag of an applicable record in the mirror filter management table TB3 (step S1708) and ends the series of processes according to this flowchart. The applicable record in the mirror filter management table TB3 is a record corresponding to the combination of the migration source port and the migration destination port.

In step S1706, when the switching target port is the migration destination port (step S1706: No), the virtual switch 260 makes the mirror setting for the transmission packet to the migration source port in the migration destination port (step S1709). Then, the virtual switch 260 sets "True" in the transmission flag of the applicable record in the mirror filter management table TB3 (step S1710) and ends the series of processes according to this flowchart.

With this procedure, in the migration source switch, at the timing when the mirror switching notification CN is transmitted to the migration destination switch, a packet to be transmitted from the migration source port to the migration destination port thereafter is properly excluded from mirroring targets. In addition, in the migration destination switch, at the timing when the mirror switching notification CN is transmitted to the migration source switch, a packet to be transmitted from the migration destination port to the migration source port thereafter is properly treated as a mirroring target.

Packet Transmission Process Procedure

Next, a packet transmission process procedure of the information processing device PMi will be described with reference to FIG. 18.

Figure 18:
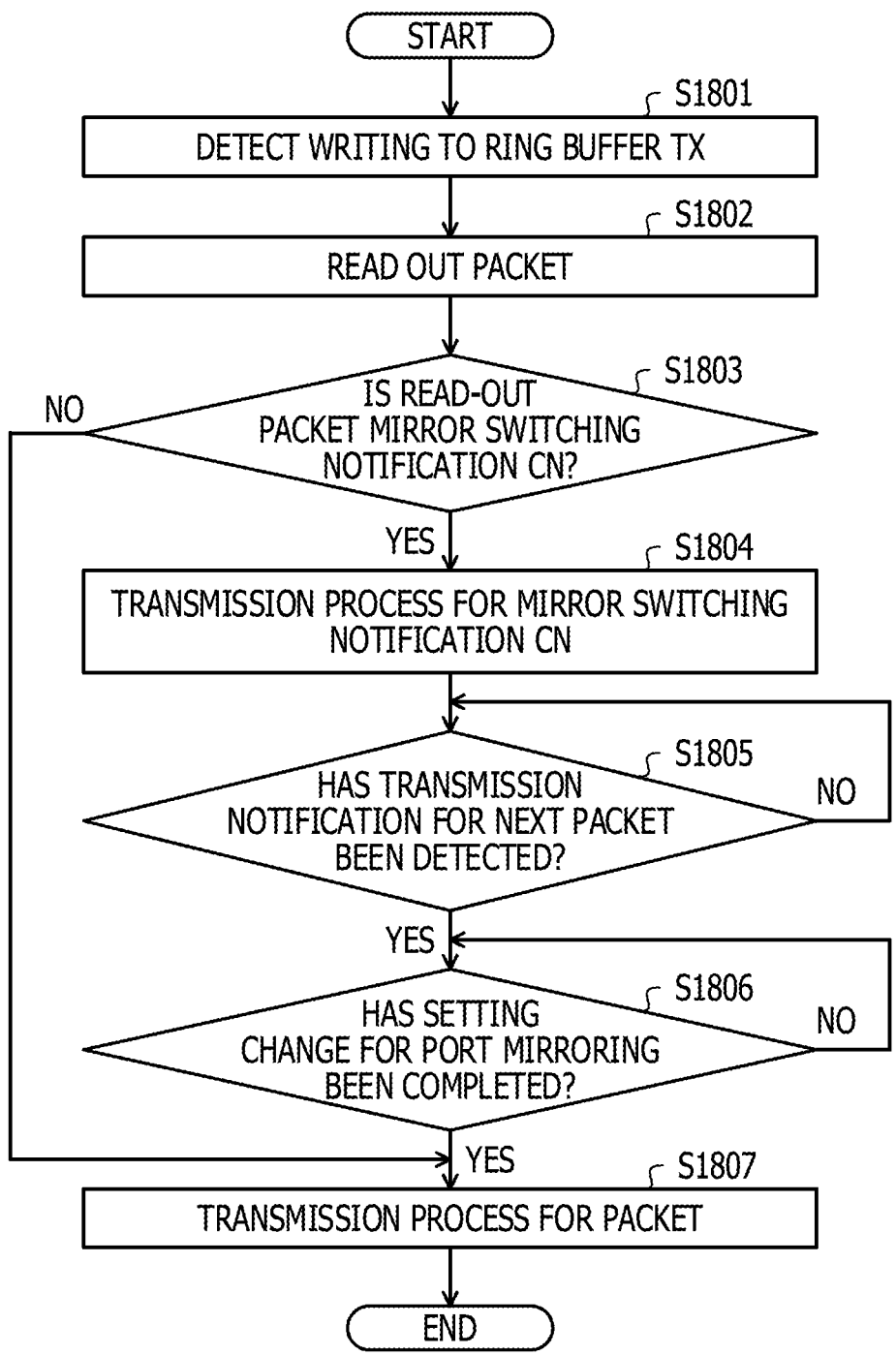
FIG. 18 is a flowchart illustrating an example of a packet transmission process procedure of the information processing device PMi.

FIG. 18 is a flowchart illustrating an example of the packet transmission process procedure of the information processing device PMi. In the flowchart in FIG. 18, first, the virtual switch 260 of the information processing device PMi detects the transmission notification written to the ring buffer TX on the shared memory 290 (step S1801).

Next, the virtual switch 260 reads out a packet from the write destination address of the shared memory 290 (step S1802). Then, the virtual switch 260 determines whether or not the read-out packet is the mirror switching notification CN (step S1803). At this point, when the read-out packet is not the mirror switching notification CN (step S1803: No), the virtual switch 260 proceeds to step S1807.

On the other hand, when the read-out packet is the mirror switching notification CN (step S1803: Yes), the virtual switch 260 performs the transmission process for the mirror switching notification CN (step S1804). Then, the virtual switch 260 determines whether or not the transmission notification for the next packet written to the ring buffer TX has been detected (step S1805).

At this point, the virtual switch 260 waits to detect the transmission notification written for the next packet (step S1805: No). Then, when detecting the transmission notification written for the next packet (step S1805: Yes), the virtual switch 260 determines whether or not the setting change for port mirroring has been completed (step S1806).

At this point, the virtual switch 260 waits for the setting change for port mirroring to be completed (step S1806: No). Then, when the setting change for port mirroring has been completed (step S1806: Yes), the virtual switch 260 performs the transmission process for a packet (step S1807) and ends the series of processes according to this flowchart.

With this procedure, when the mirror switching notification CN is transmitted, the next packet is reliably restrained from being transmitted during a period until the setting change for port mirroring is completed after the mirror switching notification CN is transmitted.

Packet Reception Process Procedure

Next, a packet reception process procedure of the information processing device PMi will be described with reference to FIG. 19.

Figure 19:
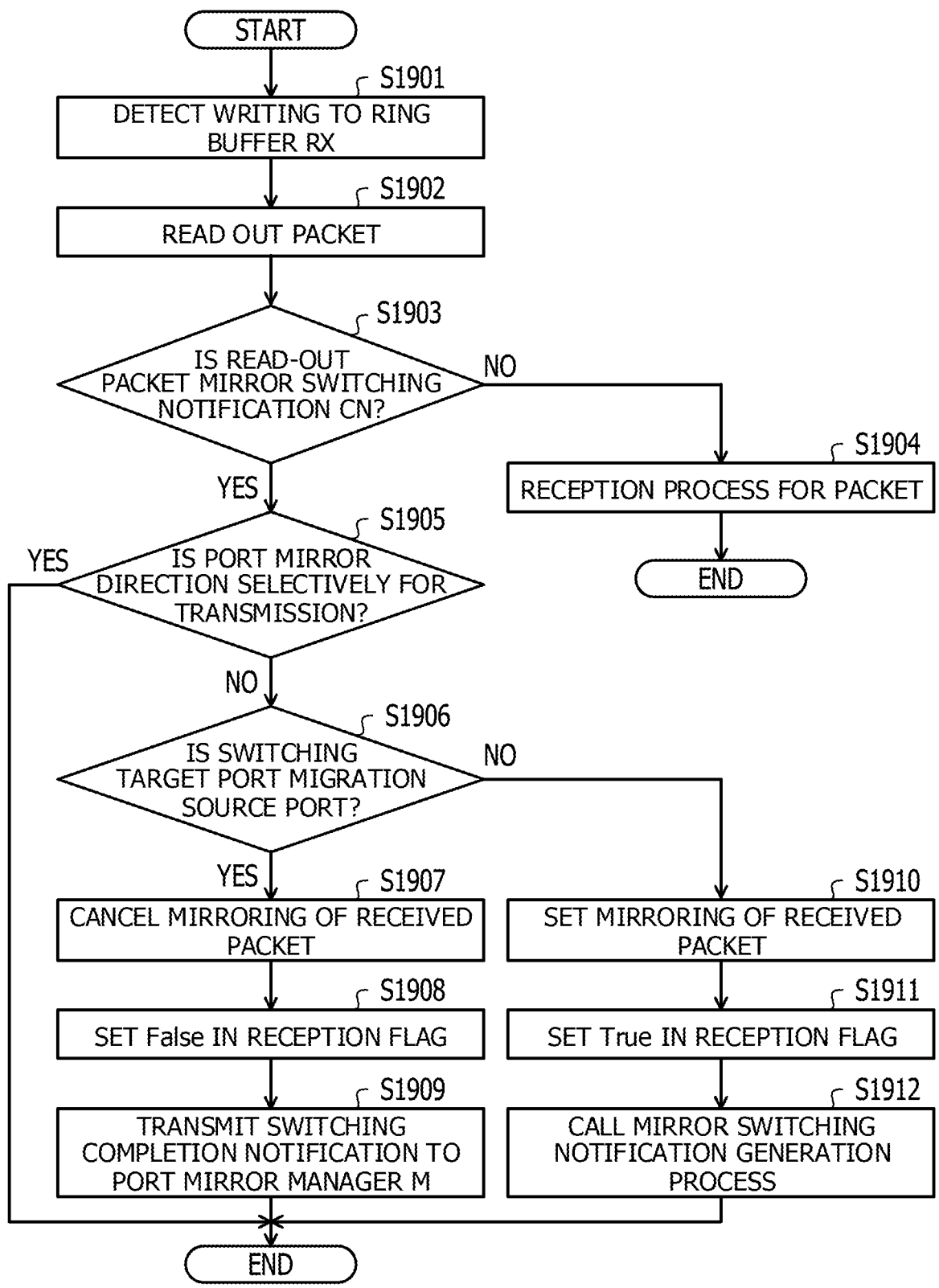
FIG. 19 is a flowchart illustrating an example of a packet reception process procedure of the information processing device PMi.

FIG. 19 is a flowchart illustrating an example of the packet reception process procedure of the information processing device PMi. In the flowchart in FIG. 19, first, the virtual switch 260 of the information processing device PMi detects the reception notification written to the ring buffer RX on the shared memory 290 (step S1901).

Next, the virtual switch 260 reads out a packet from the write destination address of the shared memory 290 (step S1902). Then, the virtual switch 260 determines whether or not the read-out packet is the mirror switching notification CN (step S1903). At this point, when the read-out packet is not the mirror switching notification CN (step S1903: No), the virtual switch 260 performs the reception process for the packet (step S1904) and ends the series of processes according to this flowchart.

On the other hand, when the read-out packet is the mirror switching notification CN (step S1903: Yes), the virtual switch 260 determines whether or not the port mirror direction is selectively for transmission (step S1905). At this point, when the port mirror direction is selectively for transmission (step S1905: Yes), the virtual switch 260 ends the series of processes according to this flowchart.

On the other hand, when the port mirror direction is not selectively for transmission (step S1905: No), the virtual switch 260 determines whether or not the switching target port included in the virtual switch 260 is the migration source port (step S1906). At this point, when the switching target port is the migration source port (step S1906: Yes), the virtual switch 260 cancels the mirror setting for the received packet from the migration destination port in the migration source port (step S1907).

Next, the virtual switch 260 sets "False" in the reception flag of an applicable record in the mirror filter management table TB3 (step S1908). The applicable record in the mirror filter management table TB3 is a record corresponding to the combination of the migration source port and the migration destination port.

Then, the virtual switch 260 transmits, to the port mirror manager M, a switching completion notification indicating that the switching of the mirror port has been completed (step S1909) and ends the series of processes according to this flowchart.

Meanwhile, in step S1906, when the switching target port is the migration destination port (step S1906: No), the virtual switch 260 makes the mirror setting for the received packet from the migration source port in the migration destination port (step S1910). Next, the virtual switch 260 sets "True" in the reception flag of the applicable record in the mirror filter management table TB3 (step S1911).

Then, the virtual switch 260 calls the mirror switching notification generation process illustrated in FIG. 17 using the port ID of the migration source port as the notification destination parameter (step S1912) and ends the series of processes according to this flowchart.

With this procedure, in the migration source switch, at the timing when the mirror switching notification CN is received from the migration destination switch, a packet to be received from the migration destination port in the migration source port thereafter is properly excluded from mirroring targets. In addition, in the migration destination switch, at the timing when the mirror switching notification CN is received from the migration source switch, a packet to be received from the migration source port in the migration destination port thereafter is properly treated as a mirroring target.

Mirror Filter Process Procedure

Next, the mirror filter process procedure of the information processing device PMi will be described with reference to FIG. 20. Here, the mirror filter process for a port to be switched for the mirror port (switching target port) will be described.

Figure 20:
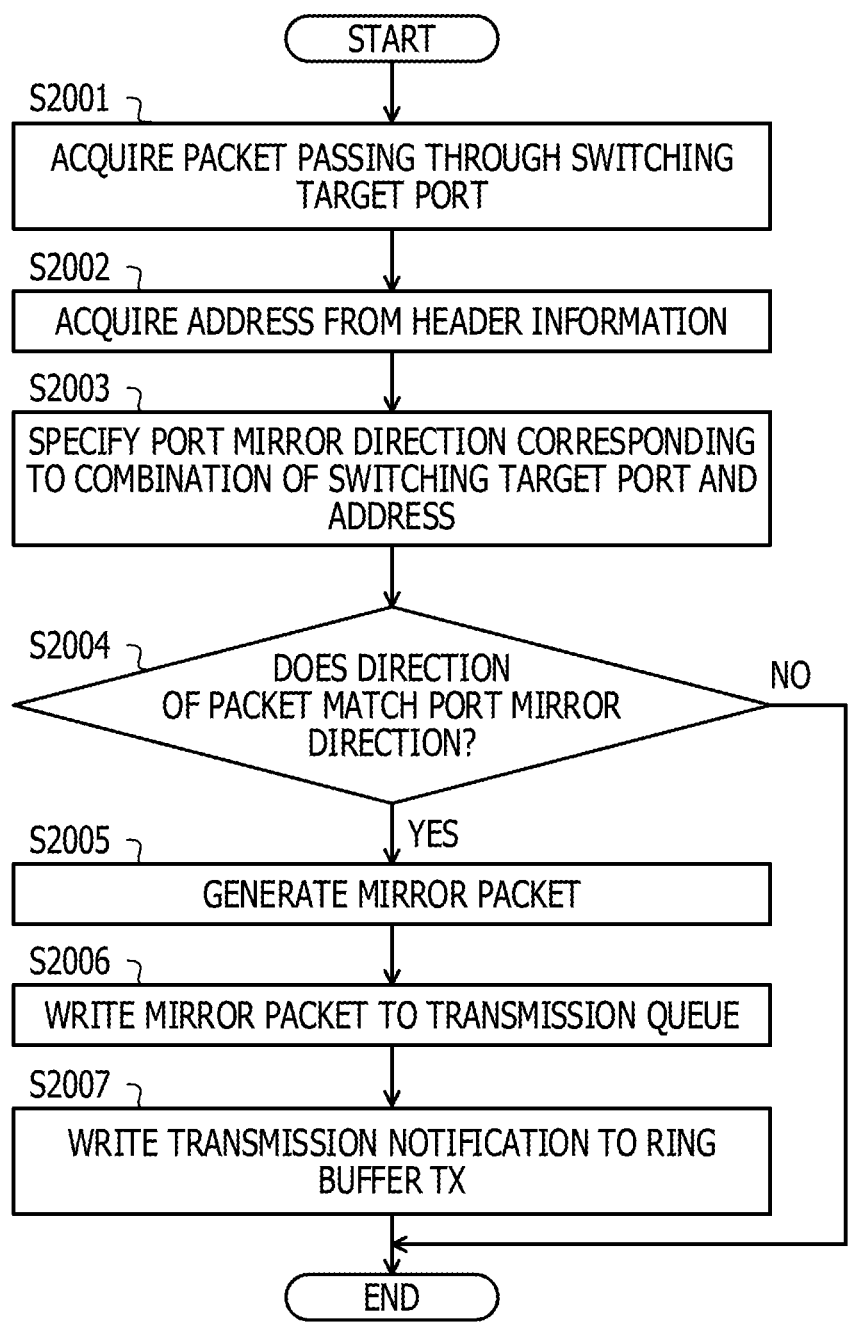
FIG. 20 is a flowchart illustrating an example of a mirror filter process procedure of the information processing device PMi.

FIG. 20 is a flowchart illustrating an example of the mirror filter process procedure of the information processing device PMi. In the flowchart in FIG. 20, first, the virtual switch 260 of the information processing device PMi acquires a packet passing through the switching target port (the migration source port or the migration destination port) of the virtual switch 260 (step S2001).

Next, the virtual switch 260 acquires the address (the transmission source address or the destination address) from the header information of the acquired packet (step S2002). Then, the virtual switch 260 refers to the mirror filter management table TB3 to specify the port mirror direction corresponding to the combination of the switching target port and the address (the transmission source address or the destination address) (step S2003).

Next, the virtual switch 260 determines whether or not the direction of the acquired packet matches the specified port mirror direction (step S2004). At this point, when the direction of the packet does not match the port mirror direction (step S2004: No), the virtual switch 260 ends the series of processes according to this flowchart.

On the other hand, when the direction of the packet matches the port mirror direction (step S2004: Yes), the virtual switch 260 copies the acquired packet to generate a mirror packet (step S2005). Next, the virtual switch 260 writes the generated mirror packet to the transmission queue of the shared memory 290 (step S2006).

Then, the virtual switch 260 writes the transmission notification to the ring buffer TX on the shared memory 290 (step S2007) and ends the series of processes according to this flowchart. With this procedure, a packet passing through the switching target port is properly filtered according to the mirror setting in the switching target port.

As described thus far, in the information processing device PMi according to the embodiment, the mirror switching notification CN is transmitted to the migration destination switch in response to the mirror switching instruction CI and at the same time the mirror setting for the transmission packet to the migration destination port is suitably canceled in the migration source port. Furthermore, according to the information processing device PMi, the mirror setting for the received packet from the migration destination port is suitably canceled in the migration source port in response to the mirror switching notification CN from the migration destination switch.

Consequently, in the migration source switch, at the timing when the mirror switching notification CN is transmitted to the migration destination switch, a packet to be transmitted from the migration source port to the migration destination port thereafter is properly excluded from mirroring targets. In addition, in the migration source switch, at the timing when the mirror switching notification CN is received from the migration destination switch, a packet to be received from the migration destination port in the migration source port thereafter is properly excluded from mirroring targets.

Furthermore, according to the information processing device PMi, the transmission process for a packet transmitted next to the mirror switching notification CN from the migration source port is allowed to be performed after the process of canceling the mirror setting for the transmission packet to the migration destination port is completed in the migration source port. With this configuration, the next packet is reliably restrained from being transmitted to the migration destination switch during a period until the setting change for port mirroring is completed after the mirror switching notification CN is transmitted, whereby mirror packet duplication is reliably restrained.

Additionally, according to the information processing device PMi, even when the mirror setting for the received packet from the migration destination port is canceled, among the received packets received after the mirror switching notification CN from the migration destination switch, a received packet whose sequence number indicating the transmission order of the transmission from the migration destination port is equal to or less than the sequence number B is normally mirrored. In this case, the mirror switching notification CN from the migration destination switch is set with a priority higher than priorities of other packets and includes the sequence number B indicating the transmission order of a packet transmitted from the migration destination port immediately before the mirror switching notification CN.

Consequently, even if the mirror setting for the received packet is canceled in response to the mirror switching notification CN from the migration destination switch, a packet overtaken by the mirror switching notification CN in the middle of the communication is normally mirrored and a mirroring failure (packet loss) is reliably restrained.

Furthermore, according to the information processing device PMi, the mirror setting for the received packet from the migration source port is suitably made in the migration destination port in response to the mirror switching notification CN from the migration source switch. In addition, according to the information processing device PMi, in response to the mirror setting made for the received packet, the mirror switching notification CN is transmitted to the migration source switch and at the same time the mirror setting for the transmission packet to the migration source port is suitably made in the migration destination port.

Consequently, in the migration destination switch, at the timing when the mirror switching notification CN is received from the migration source switch, a packet to be received from the migration source port in the migration destination port thereafter is properly treated as a mirroring target. In addition, in the migration destination switch, at the timing when the mirror switching notification CN is transmitted to the migration source switch, a packet to be transmitted from the migration destination port to the migration source port thereafter is properly treated as a mirroring target.

Furthermore, according to the information processing device PMi, the transmission process for a packet transmitted next to the mirror switching notification CN from the migration destination port is allowed to be performed after the process of making the mirror setting for the transmission packet to the migration source port is completed in the migration destination port. Consequently, the next packet is reliably restrained from being transmitted to the migration source switch during a period until the setting change for port mirroring is completed after the mirror switching notification CN is transmitted, whereby a mirroring failure (packet loss) is reliably restrained.

Additionally, according to the information processing device PMi, even when the mirror setting for the received packet from the migration source port is made, among the received packets received after the mirror switching notification CN from the migration source switch, a received packet whose sequence number indicating the transmission order of the transmission from the migration source port is equal to or less than the sequence number B is properly excluded from mirroring targets. In this case, the mirror switching notification CN from the migration source switch is set with a priority higher than priorities of other packets and includes the sequence number B indicating the transmission order of a packet transmitted from the migration source port immediately before the mirror switching notification CN.

Consequently, even if the mirror setting for the received packet is made in response to the mirror switching notification CN from the migration source switch, a packet overtaken by the mirror switching notification CN in the middle of the communication is properly excluded from mirroring targets and mirror packet duplication is reliably restrained.

According to the above configurations, in the system 200 and the information processing device PMi according to the embodiment, the mirror settings in the migration source port and the migration destination port are reliably switched at the timing when the mirror switching notification CN is transmitted and received between the migration source switch and the migration destination switch. Consequently, the mirror port is reliably switched in the migration source switch and the migration destination switch at the aligned timing of switching the mirror port, without causing packet loss or duplication. In addition, since the related virtual machines 250 are not suspended when the mirror port is switched, the mirror port is preferably switched without stopping the communication other than for the mirroring target or a process other than the communication.

The port switching method described in the present embodiment can be implemented by executing a program prepared in advance on a computer such as a personal computer or a workstation. The port switching program according to the present embodiment is recorded in a computer-readable recording medium such as a hard disk, a flexible disk, a CD-ROM, a magneto-optical (MO) disk, a digital versatile disk (DVD), and a universal serial bus (USB) memory and is executed by being read out from the recording medium by a computer. Alternatively, the port switching program may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a port switching program for causing a computer to execute a process comprising:
    transmitting, in response to a mirror switching instruction that specifies a migration source port and a migration destination port, a first mirror switching notification to a virtual switch that has the migration destination port to request a change of mirror setting in the migration destination port;
    canceling mirror setting for a transmission packet to the migration destination port in the migration source port; and
    canceling mirror setting for a received packet from the migration destination port in the migration source port in response to a second mirror switching notification from the virtual switch, the second mirror switching notification indicating the change of the mirror setting in the migration destination port,
    the second mirror switching notification is set with a priority higher than priorities of other packets, and includes a predetermined number that indicates a transmission order of a packet transmitted from the migration destination port immediately before the second mirror switching notification, and the process includes: a process to mirror, even when the mirror setting for the received packet from the migration destination port is canceled, a received packet whose number that indicates a transmission order of transmission from the migration destination port is equal to or less than the predetermined number, among received packets received after the second mirror switching notification.

2. The non-transitory computer-readable recording medium according to claim 1, wherein the process includes a transmission process for a packet transmitted next to the first mirror switching notification from the migration source port after the process of canceling the mirror setting for the transmission packet is completed.

3. The non-transitory computer-readable recording medium according to claim 1, wherein the process of canceling the mirror setting for the transmission packet is not performed when a port mirror direction at the migration source port is selectively an input direction.

4. The non-transitory computer-readable recording medium according to claim 1, wherein the process of canceling the mirror setting for the received packet is not performed when a port mirror direction at the migration source port is selectively an output direction.

5. The non-transitory computer-readable recording medium according to claim 1, wherein the second mirror switching notification is transmitted from the virtual switch in response to the mirror setting for the received packet from the migration source port made in the migration destination port.

6. The non-transitory computer-readable recording medium according to claim 1, wherein the mirror setting for the transmission packet to the migration source port in the migration destination port is made in response to transmission of the second mirror switching notification from the virtual switch.

7. A non-transitory computer-readable recording medium having stored therein a port switching program for causing a computer to execute a process comprising:
    making mirror setting for a received packet from a migration source port in a migration destination port in response to a first mirror switching notification from a virtual switch that has the migration source port, which requests a change of mirror setting in the migration destination port;
    transmitting a second mirror switching notification that indicates the change of the mirror setting in the migration destination port to the virtual switch in response to making the mirror setting for the received packet; and
    making mirror setting for a transmission packet to the migration source port in the migration destination port,
    the first mirror switching notification is set with a priority higher than priorities of other packets, and includes a predetermined number that indicates a transmission order of a packet transmitted from the migration source port immediately before the first mirror switching notification, and the process includes a process to exclude, even when the mirror setting for the received packet from the migration source port is made, a received packet whose number that indicates a transmission order of transmission from the migration source port is equal to or less than the predetermined number, among received packets received after the first mirror switching notification, from mirroring targets.

8. The non-transitory computer-readable recording medium according to claim 7, wherein the process includes a transmission process for a packet transmitted next to the second mirror switching notification from the migration destination port after the process to make the mirror setting for the transmission packet is completed.

9. The non-transitory computer-readable recording medium according to claim 7, wherein the process to make the mirror setting for the received packet is not performed when a port mirror direction at the migration destination port is selectively an output direction.

10. The non-transitory computer-readable recording medium according to claim 7, wherein the process to make the mirror setting for the transmission packet is not performed when a port mirror direction at the migration destination port is selectively an input direction.

11. A port switching method comprising:
    transmitting, by a computer, in response to a mirror switching instruction that specifies a migration source port and a migration destination port, a first mirror switching notification to a virtual switch that has the migration destination port to request a change of mirror setting in the migration destination port;
    canceling mirror setting for a transmission packet to the migration destination port in the migration source port; and
    canceling mirror setting for a received packet from the migration destination port in the migration source port in response to a second mirror switching notification from the virtual switch, which indicates the change of the mirror setting in the migration destination port,
    the second mirror switching notification is set with a priority higher than priorities of other packets, and includes a predetermined number that indicates a transmission order of a packet transmitted from the migration destination port immediately before the second mirror switching notification, and the method further includes: a process to mirror, even when the mirror setting for the received packet from the migration destination port is canceled, a received packet whose number that indicates a transmission order of transmission from the migration destination port is equal to or less than the predetermined number, among received packets received after the second mirror switching notification.

12. The port switching method according to claim 11, further comprising: transmitting a packet transmitted next to the first mirror switching notification from the migration source port after the process of canceling the mirror setting for the transmission packet is completed.

13. The port switching method according to claim 11, wherein the process of canceling the mirror setting for the transmission packet is not performed when a port mirror direction at the migration source port is selectively an input direction.

14. The port switching method according to claim 11, wherein the process of canceling the mirror setting for the received packet is not performed when a port mirror direction at the migration source port is selectively an output direction.

15. The port switching method according to claim 11, wherein the second mirror switching notification is transmitted from the virtual switch in response to the mirror setting for the received packet from the migration source port made in the migration destination port.

16. The port switching method according to claim 11, wherein the mirror setting for the transmission packet to the migration source port in the migration destination port is made in response to transmission of the second mirror switching notification from the virtual switch.

\* \* \* \* \*